United States Patent
Hampel et al.

(10) Patent No.: US 10,278,146 B2
(45) Date of Patent: Apr. 30, 2019

(54) COORDINATION OF SIGNALING AND RESOURCE ALLOCATION IN A WIRELESS NETWORK USING RADIO ACCESS TECHNOLOGY

(71) Applicant: QUALCOMM Incorporated, San Diego, CA (US)

(72) Inventors: Karl Georg Hampel, New York, NY (US); Sundar Subramanian, Bridgewater, NJ (US); Junyi Li, Chester, NJ (US); Muhammad Nazmul Islam, Edison, NJ (US); Navid Abedini, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 15/412,362

(22) Filed: Jan. 23, 2017

(65) Prior Publication Data

US 2018/0041979 A1 Feb. 8, 2018

Related U.S. Application Data

(60) Provisional application No. 62/370,900, filed on Aug. 4, 2016.

(51) Int. Cl.
*H04B 7/00* (2006.01)
*H04W 56/00* (2009.01)
(Continued)

(52) U.S. Cl.
CPC ..... *H04W 56/0005* (2013.01); *H04W 72/042* (2013.01); *H04W 72/0413* (2013.01);
(Continued)

(58) Field of Classification Search
CPC ...... H04W 16/26; H04W 16/32; H04W 88/04
(Continued)

(56) References Cited

U.S. PATENT DOCUMENTS 8,611,291 B2* 12/2013 Ji ........................ H04L 5/0053
370/329
8,634,842 B2* 1/2014 Zhang ................... H04W 28/08
370/315

(Continued)

OTHER PUBLICATIONS

ISA/EP, International Search Report and Written Opinion of the International Searching Authority, Int'l Application No. PCT/US2017/041294, dated Oct. 9, 2017, European Patent Office, Rijswijk, NL, 15 pgs.

(Continued)

*Primary Examiner* — Dmitry Levitan
(74) *Attorney, Agent, or Firm* — Holland & Hart LLP

(57) ABSTRACT

The use of a radio access technology (RAT) may enable wireless communication using one or more node functions at a wireless node, such as a base station or access node. Additionally, multiple wireless nodes may communicate in a network using a schedule that is aligned with a frame structure. For example, a wireless node may establish a link with different wireless nodes using a RAT that supports a synchronized frame structure, such as a millimeter wave (mmW) RAT. The wireless nodes may instantiate one or more node functions, such as an access node function (ANF) and a user equipment function (UEF). The wireless nodes may then communicate according to active and suspended modes using the node functions, where the communication is based on a schedule aligned with the frame structure.

57 Claims, 12 Drawing Sheets

(51) Int. Cl.

| | | |
|---|---|---|
| *H04W 76/15* | (2018.01) | |
| *H04W 72/04* | (2009.01) | |
| *H04W 72/12* | (2009.01) | |
| *H04W 88/02* | (2009.01) | |
| *H04W 88/08* | (2009.01) | |
| *H04W 92/04* | (2009.01) | |
| *H04W 92/10* | (2009.01) | |
| *H04W 92/20* | (2009.01) | |

(52) U.S. Cl.
CPC ....... *H04W 72/0446* (2013.01); *H04W 72/12* (2013.01); *H04W 76/15* (2018.02); *H04W 88/02* (2013.01); *H04W 88/08* (2013.01); *H04W 92/045* (2013.01); *H04W 92/10* (2013.01); *H04W 92/20* (2013.01)

(58) Field of Classification Search
USPC ....... 370/310, 315, 321, 324, 326, 327, 328, 370/340
See application file for complete search history.

(56) References Cited

U.S. PATENT DOCUMENTS

| 8,660,059 | B2* | 2/2014 | Deng | H04W 88/04 |
| | | | | 370/315 |
| 8,750,196 | B2* | 6/2014 | Chen | H04W 24/02 |
| | | | | 370/315 |
| 8,792,422 | B2* | 7/2014 | Wu | H04W 72/1268 |
| | | | | 370/328 |
| 9,025,517 | B2* | 5/2015 | Wang | H04W 24/02 |
| | | | | 370/321 |
| 9,215,057 | B2* | 12/2015 | Wager | H04B 7/14 |
| 9,474,102 | B2* | 10/2016 | Sharma | H04B 7/15557 |
| 9,480,106 | B2* | 10/2016 | Zhang | H04W 92/20 |
| 9,749,099 | B2* | 8/2017 | Seo | H04L 5/001 |
| 2009/0201846 | A1 | 8/2009 | Horn et al. | |
| 2013/0044674 | A1* | 2/2013 | Teyeb | H04B 7/15542 |
| | | | | 370/315 |
| 2013/0315134 | A1* | 11/2013 | Halfmann | H04W 84/047 |
| | | | | 370/315 |

OTHER PUBLICATIONS

ETSI/3GPP, LTE; Feasibility Study for Further Advancements for E-UTRA (LTE-Advanced) (3GPP TS 36.912 Version 13.0.0 Release 13), Technical Report, Jan. 1, 2016, 62 pgs., ETSI TR 136 912 V13.0.0, XP014265669, European Telecommunications Standards Institute (ETSI), 650, Route Des Lucioles, F-06921 Sophia-Antipolis Cedex, France.

Nokia et al., "On the Wireless Relay Operation in NR," 3GPP TSG-RAN WG1 Meeting #85, R1-165031, Nanjing, P.R. China, May 23-27, 2016, 6 pgs., XP051090124, 3rd Generation Partnership Project.

Qualcomm, "Forward Compatibility Considerations on NR Integrated Access and Backhaul," 3GPP TSG-RAN WG1 Meeting #86, R1-167119, Gothenburg, Sweden, Aug. 22-26, 2016, 6 pgs., XP051142525, 3rd Generation Partnership Project.

\* cited by examiner

US 10,278,146 B2

COORDINATION OF SIGNALING AND RESOURCE ALLOCATION IN A WIRELESS NETWORK USING RADIO ACCESS TECHNOLOGY

CROSS REFERENCES

The present Application for Patent claims priority to U.S. Provisional Patent Application No. 62/370,900 by Hampel, et al., entitled "Coordination of Signaling and Resource Allocation in a Wireless Network Using Radio Access Technology," filed Aug. 4, 2016, assigned to the assignee hereof, and is hereby expressly incorporated by reference herein in its entirety.

BACKGROUND

The following relates generally to wireless communication at a wireless node, and more specifically to coordination of signaling and resource allocation in a wireless network such as, for example, a wireless backhaul network using radio access technology (RAT).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of wireless nodes, such as access nodes or base stations, each simultaneously supporting communication for multiple communication devices, which may be otherwise known as user equipment (UE).

In some wireless communications systems, an access node may typically enjoy a robust wireline link to a network entity that coordinates aspects of backhaul communications (e.g., the network entity provides timing information, cell identity, etc.) for neighboring access nodes to coordinate backhaul transmissions. Access nodes operating in millimeter wave (mmW) frequency ranges may be associated with a reduced coverage area (e.g., a smaller geographic footprint, directional transmissions, etc.), which may result in a deployment of a larger number of access nodes to provide acceptable coverage areas to users. As a result, a number of access nodes within the wireless communication system may not be coupled with a wireline backhaul link and may instead use wireless backhaul links for backhaul communications. However, such a dense deployment of mmW access nodes may be affected by inefficient resource allocation and uncoordinated signaling in the absence of techniques that provide coherent wireless resource allocation and scheduling.

SUMMARY

The described techniques relate to improved methods, systems, devices, or apparatuses that support coordinated signaling and resource allocation in a wireless network such as, for example, a wireless backhaul network using a radio access technology (RAT). Generally, the described techniques provide for the use of a RAT to enable wireless backhaul communication using one or more node functions at a wireless node (e.g., a base station, an access node, etc.). Additionally, multiple wireless nodes may communicate in a backhaul network using a schedule that is aligned with a frame structure. For example, a wireless node may establish a link with different wireless nodes using a RAT, such as a millimeter wave (mmW) RAT, that supports a synchronized frame structure. The wireless nodes may each instantiate one or more node functions, such as an access node function (ANF) or a user equipment function (UEF). The wireless nodes may then communicate according to active and suspended modes using the node functions, where the communication is based on a schedule aligned with the frame structure.

A method of wireless communication at a wireless node is described. The method may include establishing one or more communication links with a corresponding one or more other wireless nodes using a RAT that supports a synchronized and slotted frame structure for uplink transmissions and downlink transmissions, instantiating, at the wireless node, one or more node functions based at least in part on node functions at the one or more other wireless nodes, wherein the one or more node functions are selected from an ANF and a UEF, and communicating, with the one or more other wireless nodes, according to an active mode or a suspended mode using the one or more node functions.

An apparatus for wireless communication at a wireless node is described. The apparatus may include means for establishing one or more communication links with a corresponding one or more other wireless nodes using a RAT that supports a synchronized and slotted frame structure for uplink transmissions and downlink transmissions, means for instantiating, at the wireless node, one or more node functions based at least in part on node functions at the one or more other wireless nodes, wherein the one or more node functions are selected from an ANF and a UEF, and means for communicating, with the one or more other wireless nodes, according to an active mode or a suspended mode using the one or more node functions.

Another apparatus for wireless communication at a wireless node is described. The apparatus may include a processor, memory in electronic communication with the processor, and instructions stored in the memory. The instructions may be operable to cause the processor to establish one or more communication links with a corresponding one or more other wireless nodes using a RAT that supports a synchronized and slotted frame structure for uplink transmissions and downlink transmissions, instantiate, at the wireless node, one or more node functions based at least in part on node functions at the one or more other wireless nodes, wherein the one or more node functions are selected from an ANF and a UEF, and communicate, with the one or more other wireless nodes, according to an active mode or a suspended mode using the one or more node functions.

A non-transitory computer readable medium for wireless communication at a wireless node is described. The non-transitory computer-readable medium may include instructions operable to cause a processor to establish one or more communication links with a corresponding one or more other wireless nodes using a RAT that supports a synchronized and slotted frame structure for uplink transmissions and downlink transmissions, instantiate, at the wireless node, one or more node functions based at least in part on node functions at the one or more other wireless nodes, wherein the one or more node functions are selected from an ANF and a UEF, and communicate, with the one or more other wireless nodes, according to an active mode or a suspended mode using the one or more node functions.

Some examples of the method, apparatus, and non-transitory computer-readable medium described above may further include processes, features, means, or instructions for switching between the active mode and the suspended mode designated for each of the one or more node functions based as least in part on a schedule, wherein the schedule may be aligned with the slotted frame structure. Some examples of the method, apparatus, and non-transitory computer-readable medium described above may further include processes, features, means, or instructions for instantiating the ANF. Some examples of the method, apparatus, and non-transitory computer-readable medium described above may further include processes, features, means, or instructions for scheduling data traffic, during the active mode, over the one or more communication links.

Some examples of the method, apparatus, and non-transitory computer-readable medium described above may further include processes, features, means, or instructions for instantiating the UEF. Some examples of the method, apparatus, and non-transitory computer-readable medium described above may further include processes, features, means, or instructions for following scheduling instructions, during the active mode, for data traffic over the one or more communication links. Some examples of the method, apparatus, and non-transitory computer-readable medium described above may further include processes, features, means, or instructions for instantiating the ANF. Some examples of the method, apparatus, and non-transitory computer-readable medium described above may further include processes, features, means, or instructions for transmitting downlink data on the one or more communication links. Some examples of the method, apparatus, and non-transitory computer-readable medium described above may further include processes, features, means, or instructions for receiving uplink data on the one or more communication links.

Some examples of the method, apparatus, and non-transitory computer-readable medium described above may further include processes, features, means, or instructions for instantiating the UEF. Some examples of the method, apparatus, and non-transitory computer-readable medium described above may further include processes, features, means, or instructions for transmitting uplink data on the one or more communication links. Some examples of the method, apparatus, and non-transitory computer-readable medium described above may further include processes, features, means, or instructions for receiving downlink data on the one or more communication links.

Some examples of the method, apparatus, and non-transitory computer-readable medium described above may further include processes, features, means, or instructions for instantiating the ANF. Some examples of the method, apparatus, and non-transitory computer-readable medium described above may further include processes, features, means, or instructions for communicating with one or more user equipment (UEs). Some examples of the method, apparatus, and non-transitory computer-readable medium described above may further include processes, features, means, or instructions for forwarding data between the one or more UEs and the one or more other wireless nodes based at least in part on the communication.

In some examples of the method, apparatus, and non-transitory computer-readable medium described above, the communicating with the one or more UEs and the communicating using the one or more node functions shares a same set of wireless resources. Some examples of the method, apparatus, and non-transitory computer-readable medium described above may further include processes, features, means, or instructions for instantiating at least one UEF for communicating with a first wireless node of the one or more other wireless nodes. Some examples of the method, apparatus, and non-transitory computer-readable medium described above may further include processes, features, means, or instructions for instantiating at least one ANF for communicating with the first wireless node.

Some examples of the method, apparatus, and non-transitory computer-readable medium described above may further include processes, features, means, or instructions for instantiating at least a first UEF for communicating with a first wireless node of the one or more other wireless nodes. Some examples of the method, apparatus, and non-transitory computer-readable medium described above may further include processes, features, means, or instructions for instantiating at least a second UEF for communicating with a second wireless node of the one or more other wireless nodes, wherein the first wireless node may be different than the second wireless node.

Some examples of the method, apparatus, and non-transitory computer-readable medium described above may further include processes, features, means, or instructions for instantiating the ANF upon confirming that the one or more other wireless nodes may be instantiated or may be to be instantiated as UEFs. Some examples of the method, apparatus, and non-transitory computer-readable medium described above may further include processes, features, means, or instructions for instantiating the UEF upon confirming that the one or more other wireless nodes may be instantiated or may be to be instantiated as ANFs.

Some examples of the method, apparatus, and non-transitory computer-readable medium described above may further include processes, features, means, or instructions for accessing a routing table associated with the one or more other wireless nodes. Some examples of the method, apparatus, and non-transitory computer-readable medium described above may further include processes, features, means, or instructions for forwarding data between the wireless node and the one or more other wireless nodes based at least in part on the routing table.

Some examples of the method, apparatus, and non-transitory computer-readable medium described above may further include processes, features, means, or instructions for instantiating a routing function associated with the one or more other wireless nodes. Some examples of the method, apparatus, and non-transitory computer-readable medium described above may further include processes, features, means, or instructions for forwarding data between the wireless node and the one or more other wireless nodes in accordance with the routing function.

Some examples of the method, apparatus, and non-transitory computer-readable medium described above may further include processes, features, means, or instructions for accessing a routing table associated with the one or more node functions. Some examples of the method, apparatus, and non-transitory computer-readable medium described above may further include processes, features, means, or instructions for forwarding data between the one or more node functions based at least in part on the routing table.

Some examples of the method, apparatus, and non-transitory computer-readable medium described above may further include processes, features, means, or instructions for instantiating a routing function associated with the one or more node functions. Some examples of the method, apparatus, and non-transitory computer-readable medium described above may further include processes, features, means, or instructions for forwarding data between the one or more node functions in accordance with the routing function.

In some examples of the method, apparatus, and non-transitory computer-readable medium described above, the one or more communication links comprises a single link between the wireless node and another wireless node. In some examples of the method, apparatus, and non-transitory computer-readable medium described above, the wireless node or the one or more other wireless nodes may be coupled with a wireline backhaul link for a network. In some examples of the method, apparatus, and non-transitory computer-readable medium described above, the one or more communication links comprise backhaul links. In some examples of the method, apparatus, and non-transitory computer-readable medium described above, the wireless node and the one or more other wireless nodes comprise backhaul access nodes. In some examples of the method, apparatus, and non-transitory computer-readable medium described above, the RAT comprises a millimeter wave RAT.

DETAILED DESCRIPTION

Figure 1:
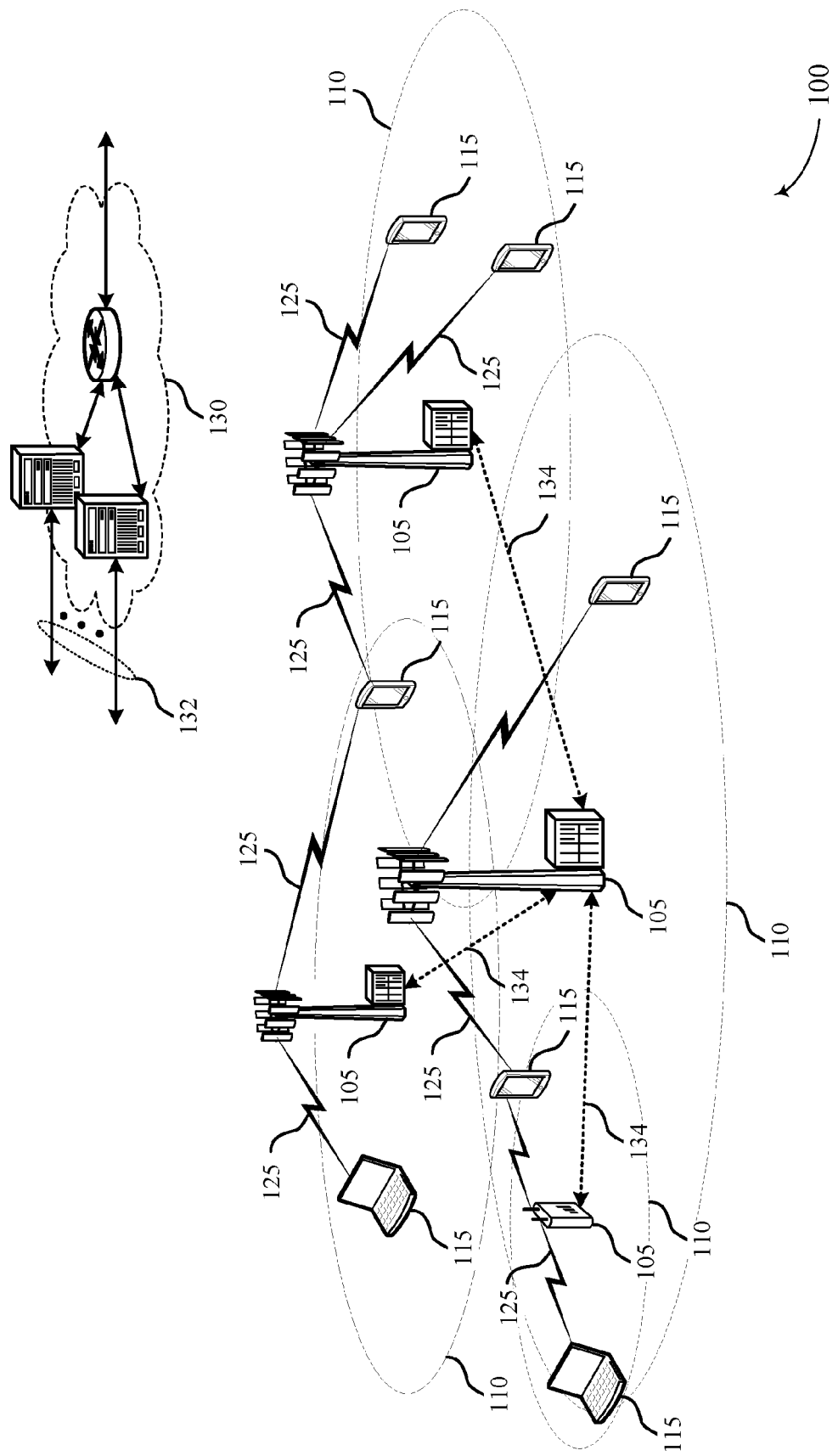
FIG. 1 illustrates an example of a system for wireless communication at a wireless node that supports coordination of signaling and resource allocation in a wireless network using radio access technology in accordance with aspects of the present disclosure.

Some wireless communications systems may operate in millimeter wave (mmW) frequency ranges (e.g., 28 GHz, 40 GHz, 60 GHz, etc.). In such mmW systems, signal processing techniques, such as beamforming, may be used to coherently combine energy and overcome path losses at these frequencies. Wireless communication links achieved through beamforming may be associated with narrow beams (e.g., "pencil beams") that are highly directional, minimize inter-link interference, and provide high-bandwidth links between wireless nodes (e.g., base stations, access nodes, etc.).

Wireless communications systems also utilize backhaul links as a connection between a core network and access nodes within the wireless communications network. However, due to the widespread deployment of access nodes within a given region, installing wireline backhaul links to each access node within a network may be cost prohibitive. Therefore, cellular radio access technologies (RATs) may be used to provide backhaul links between multiple access nodes and a core network. In such cases, access nodes may wirelessly communicate backhaul access traffic to a high-capacity fiber point (e.g., a location where a wireless node is coupled with a wireline link to a network). Backhaul techniques that use cellular radio access technologies to coordinate signaling and resource allocation for a wireless backhaul network may provide a more beneficial method of backhaul communication for a dense population of mmW access nodes (e.g., provide a lower cost and a more feasible option to installing fiber optic communication lines to each mmW access node). Additionally, integration of mobile access and backhaul may be implemented in such systems.

In some cases, a number of access nodes (such as wireless backhaul nodes) may be interconnected and thus, form a star topology. In such cases, the access nodes may instantiate one or more node functions to coordinate signaling and resource allocation. The one or more node functions, such as an access node function (ANF) and a user equipment function (UEF), can be assigned the functionalities and signaling protocols for resource allocation normally defined by a RAT.

To coordinate timing of transmission and reception, all backhaul links may be coordinated using time synchronization, where a frame structure supported by a cellular RAT may be used. In some cases, a large-scale or network-wide time division multiplexed (TDM) schedule (e.g., a super schedule) may be used to assign resources to the various access nodes in a coordinated manner. The schedule may be followed by all participating wireless nodes through a mutual time synchronization and the frame structure, which may be defined by the RAT. While described with reference to wireless backhaul networks, the concepts explained herein may also be applied to non-backhaul wireless networks.

Aspects of the disclosure are initially described in the context of a wireless communications system. Further examples are then provided that illustrate backhaul networks and a schedule used for efficient wireless backhaul communication between multiple access nodes. Aspects of the disclosure are further illustrated by and described with reference to apparatus diagrams, system diagrams, and flowcharts that relate to coordination of signaling and resource allocation in a wireless backhaul network using radio access technology.

FIG. 1 illustrates an example of a wireless communications system 100 in accordance with various aspects of the present disclosure. The wireless communications system 100 includes wireless nodes, such as access nodes 105 (e.g., base stations, remote radio heads, etc.), user equipments (UEs) 115, and a core network 130. In some examples, the wireless communications system 100 may be a LTE or LTE-Advanced network. Wireless communications system 100 may support one or more node functions that enable coherent resource allocation and scheduling.

Access nodes 105 may wirelessly communicate with UEs 115 via one or more access node antennas. Each access node 105 may provide communication coverage for a respective geographic coverage area 110. Communication links 125 shown in wireless communications system 100 may include uplink transmissions from a UE 115 to an access node 105, or downlink transmissions, from an access node 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Access nodes 105 may communicate with the core network 130 and with one another. For example, access nodes 105 may interface with the core network 130 through backhaul links 132 (e.g., S1, etc.). Access nodes 105 may communicate with one another over backhaul links 134 (e.g., X2, etc.) either directly or indirectly (e.g., through core network 130). Access nodes 105 may perform radio configuration and scheduling for communication with UEs 115 or may operate under the control of an access node controller (not shown). In some examples, access nodes 105 may be macro cells, small cells, hot spots, or the like. Access nodes 105 may also be referred to as eNodeBs (eNBs) 105.

Wireless communications system 100 may operate in mmW frequency ranges (e.g., 28 GHz, 40 GHz, 60 GHz, etc.). Wireless communication at these frequencies may be associated with increased signal attenuation (e.g., path loss), which may also be influenced by various factors, such as temperature, barometric pressure, diffraction, etc.). As a result, signal processing techniques, such as beamforming, may be used to coherently combine energy and overcome path losses at these frequencies. Further, wireless communication links achieved through beamforming may be associated with narrow beams (e.g., "pencil beams") that are highly directional, minimize inter-link interference, and provide high-bandwidth links between access nodes. Dynamic beam-steering and beam-search capabilities may further support, for example, discovery, link establishment, and beam refinement in the presence of dynamic shadowing and Rayleigh fading. Additionally, communication in such mmW systems may be time division multiplexed, where a transmission may only be directed to one wireless device at a time due to the directionality of the transmitted signal.

Wireless communications networks may employ backhaul links (e.g., backhaul links 132 or backhaul links 134) as a connection between a core network and wireless nodes within the wireless communications network. For example, wireless communications system 100 may include multiple access nodes 105 (e.g., base stations, remote radio heads, etc.), where at least one access node 105 is coupled to a wireline backhaul link, such as an optical fiber cable. However, due to the widespread deployment of access nodes 105 within a given region, installing wireline backhaul links to each access node 105 within a network may be cost prohibitive. Therefore, some of the access nodes 105 within wireless communications system 100 may not be directly coupled to the core network 130 or to another access node 105, and may use other means, such as wireless backhaul links, to communicate backhaul traffic. For instance, cellular RATs may be used to provide backhaul links between multiple access nodes 105 and a core network 130. In such cases, the access nodes 105 may wirelessly communicate backhaul access traffic to a high-capacity fiber point (e.g., a location where a wireless node is coupled with a wireline link to core network 130).

While mobile access may sometimes be associated with single-hop communication links between a source and destination (e.g., an asymmetric link), wireless backhaul communications may support multi-hop transport and provide robustness through topological redundancy (e.g., alternative paths for data exchange within a wireless communications network). Accordingly, underlying links using wireless backhaul communications may be symmetric in nature and use large-scale resource coordination among the wireless communication links.

In some cases, cellular RATs, such as mmW-based RATs, may be used to support access traffic between UEs 115 and access nodes 105, in addition to backhaul access traffic among multiple access nodes 105. Moreover, both access and backhaul traffic may share the same resources (e.g., as in the case of integrated access and backhaul (IAB)). Such wireless backhaul or IAB solutions may be increasingly beneficial with the evolution of cellular technologies due to enhancements in wireless link capacity and reduction in latency. Further, the use of wireless backhaul links may reduce the cost of dense small cell deployments.

In some cases, an access link using a mmW-based RAT may be designed as an asymmetric single-hop link, which may be used for assigning control and scheduling tasks to an access node 105 while providing instruction to one or more UEs 115 for scheduling communication. In such cases, an access node 105 may coordinate wireless resources among multiple UEs 115, while each UE 115 may be assigned to only one access node 105 at a time. In some cases, inter-access node links may be symmetric in nature and may form mesh topologies for enhanced robustness, where wireless transport may occur along multiple hops.

Thus, using a RAT may enable wireless backhaul communication using one or more node functions at a wireless node, such as a base station or access node. Additionally, multiple wireless nodes may communicate in a backhaul network using a schedule that is aligned with a frame structure. For example, a wireless node may establish a link with different wireless nodes using a RAT that supports a synchronized frame structure, such as a mmW RAT. The wireless nodes may instantiate one or more node functions, such as an ANF and a UEF. The wireless nodes may then communicate according to active and suspended modes using the node functions, where the communication is based on a schedule aligned with the frame structure.

Figure 2:
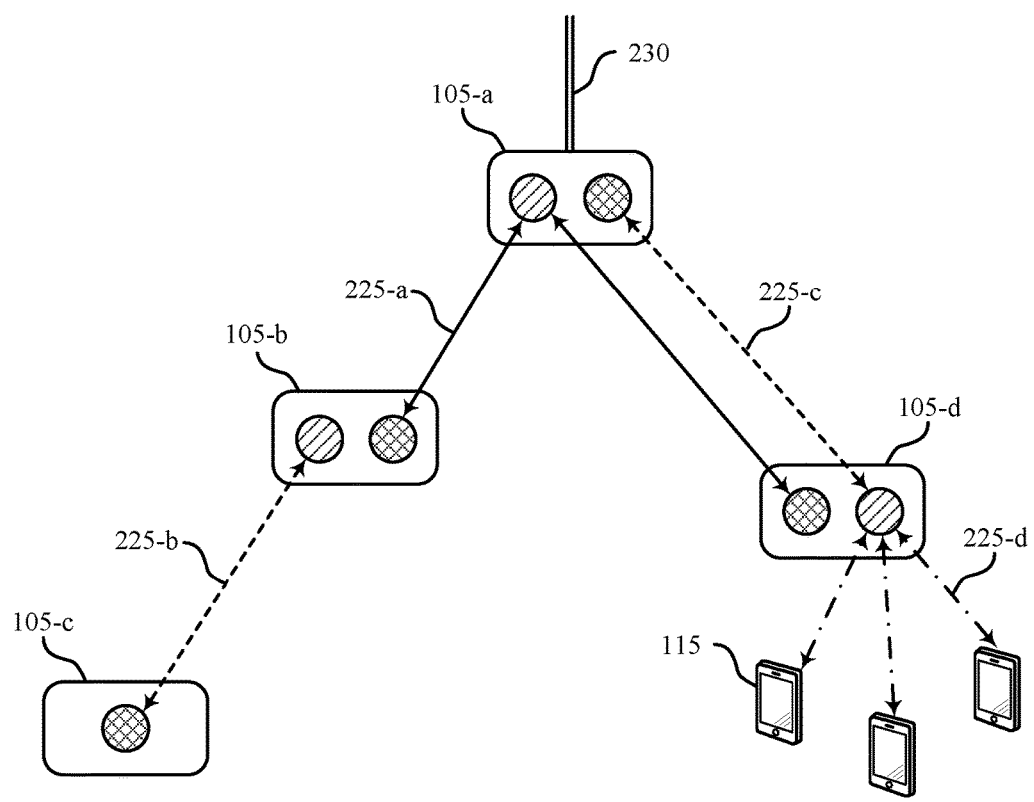
FIG. 2 illustrates an example of a backhaul network that supports coordination of signaling and resource allocation in a wireless network using radio access technology in accordance with aspects of the present disclosure.

FIG. 2 illustrates an example of a backhaul network 200 that supports coordination of signaling and resource allocation in a wireless network using RAT. In some cases, backhaul network 200 may be an example of a wireless communications network that communicates using mmW frequency ranges. Backhaul network 200 may include a number of access nodes 105 that communicate over a number of different communication links 225, where the communication links 225 may be associated with a same or different set of wireless resources. Backhaul network 200 may support the use of one or more node functions to enable efficient resource allocation for wireless backhaul communications.

In backhaul network 200, a number of access nodes 105 (e.g., access nodes 105-*a* through 105-*d*) may be interconnected via communication links 225 (e.g., backhaul links) and thus form a star topology with respect to access nodes 105 instantiated as an ANF, as described below. In such cases, the access nodes 105 may instantiate one or more node functions to coordinate signaling and resource allocation. For example, the access nodes 105 may instantiate one or more ANFs 205, one or more UEFs 210, or any combination thereof.

For example, access node 105-*a* may be located at a central point of a star, and may be connected to a wireline backhaul link 230 (i.e., an optical fiber cable). In some cases, access node 105-*a* may be the only access node 105 in backhaul network 200 that is connected to the wireline backhaul link 230. Access node 105-*a* may instantiate an ANF 205, and the access nodes 105 at the leaves of the star (e.g., access node 105-*b*, access node 105-*c*, and access node 105-*d*) may each instantiate a UEF 210. Access node 105-*a* may then communicate with access node 105-*b* and access node 105-*c* using communication link 225-*a* or communication link 225-*b* according to an active mode or a suspended mode using the node functions. In some cases, communication link 225-*a* may be associated with a first set of wireless resources.

The ANFs 205 and the UEFs 210 may be assigned the same functionalities and signaling protocols for resource allocation as defined by a RAT. That is, resource coordination of a backhaul star can be managed via the RAT, such as a mmW RAT. Furthermore, wireless resource use among access nodes 105 within a star may be coordinated via a large-scale (e.g., network-wide) schedule. Within each star, signaling and resource management may be regulated by the RAT and a resource sub-schedule may be generated by a star's ANF 205 (such as the ANF 205 instantiated at access node 105-*a*).

In some examples, access node 105-*b* may instantiate an ANF 205 in addition to the UEF 210. Access node 105-*b* may accordingly communicate with access node 105-*c* using communication link 225-*b* according to an active or a suspended mode using the node functions. In some cases, communication link 225-*b* may be associated with a second set of wireless resources.

In another example, access node 105-*d* may instantiate an ANF 205 and communicate with a UEF 210 at access node 105-*a* over communication link 225-*c*. In some examples, communication link 225-*c* may be associated with the second set of resources. That is, communication link 225-*c* may use the same resources as communication link 225-*b*. In other examples, communication link 225-*c* may use different resources than communication link 225-*b*. Additionally, the ANF 205 at access node 105-*d* may be used for mobile access, where access node 105-*d* may communicate with one or more UEs 115 over communication link 225-*d*. As a result, access node 105-*d* may forward data between the one or more UEs 115 and access node 105-*a*. Accordingly, IAB may be accomplished by including the additional star with access node 105-*d* at the center and the UEs 115 at the leaves of the star.

In some cases, ANFs 205 may support transmission of a DL control channel, reception of an UL control channel, scheduling of DL and UL data transmission within a resource space assigned to a link or to a set of links, transmission of synchronization signals and cell reference signals (e.g., as a primary synchronization symbol (PSS) or secondary synchronization symbol (SSS) on a synchronization channel), transmitting beam sweeps, and transmitting DL beam change requests. Additionally, UEFs 210 may support reception of a DL control channel, transmission of a UL control channel, requesting scheduling of UL data transmissions, transmission of random access preambles on a random access channel, listening to beam sweeps and reporting beam indexes and beam signal strength detected, and executing DL beam change requests. In some cases, there may be other features that differentiate the ANF and the UEF implemented at a node. As described above, an access node 105 may implement a combination of one or more node functions, such as multiple ANFs 205, multiple UEFs 210, or combinations thereof.

Figure 3:
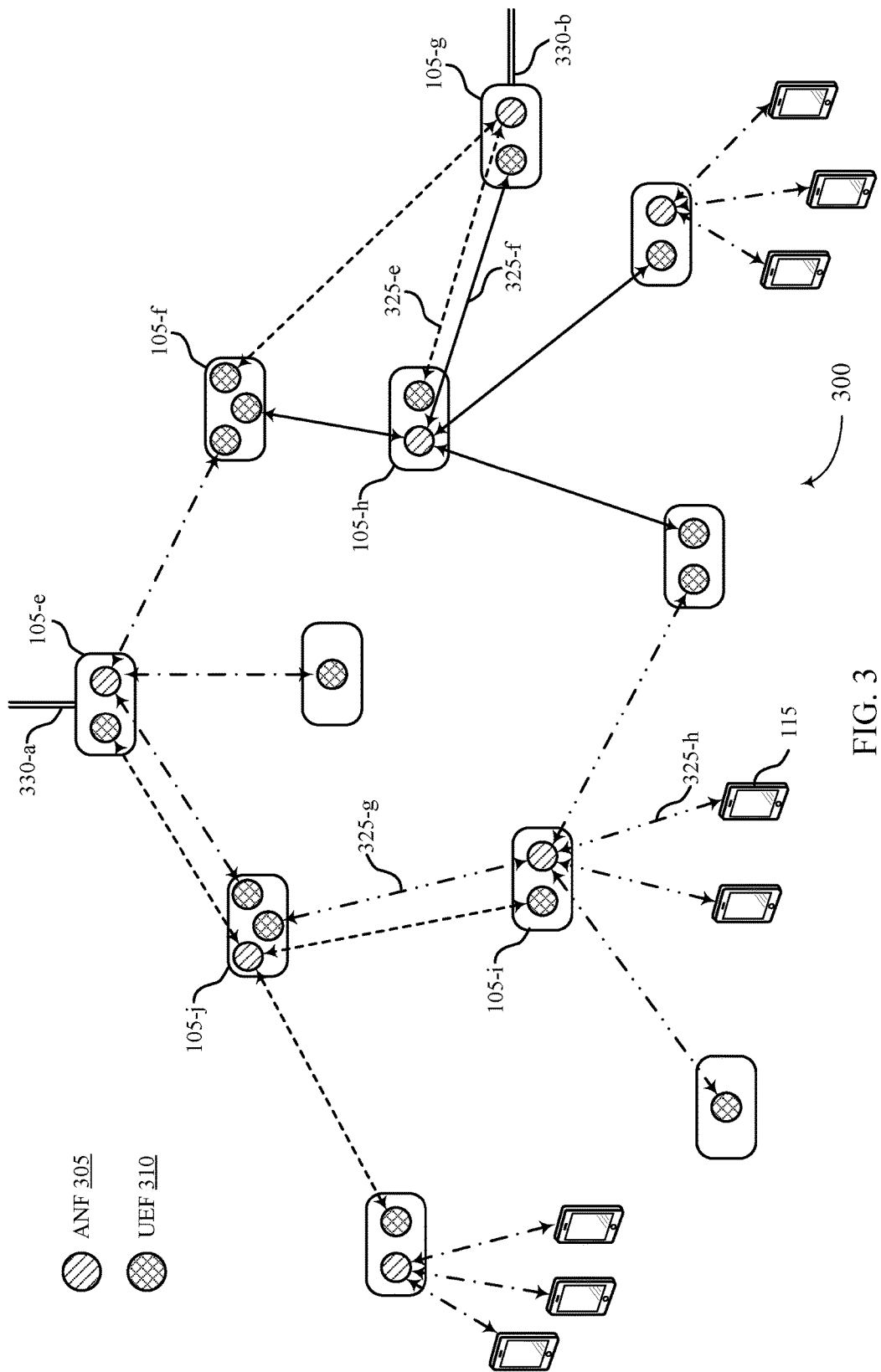
FIG. 3 illustrates an example of a backhaul network that supports coordination of signaling and resource allocation in a wireless network using radio access technology in accordance with aspects of the present disclosure.

FIG. 3 illustrates an example of a backhaul network 300 that supports coordination of signaling and resource allocation in a network using RAT. In some cases, backhaul network 300 may be an example of a wireless communications network that communicates using mmW frequency ranges. Backhaul network 300 may include a number of access nodes 105 that communicate over a number of different communication links 325, where the communication links 325 may be associated with a same or different set of wireless resources. Backhaul network 300 may be an example of a wireless communications system that supports multiple hops and topological redundancy for backhaul links using a RAT.

In some examples, complex backhaul topologies may be handled by composing the topology from multiple stars that mutually overlap. For instance, backhaul network 300 may comprise a mesh topology with two interfaces to a wireline network (e.g., access nodes 105-*e* and 105-*g* coupled with wireline backhaul links 330-*a* and 330-*b*). Such a topology may comprise multiple stars, where some stars mutually overlap. An ANF 305 may be allocated to an access node 105 at the center of each star (e.g., access nodes 105-*e*, 105-*g*, 105-*h*, etc.), while a UEF 310 may be allocated to the access node 105 at each of the leaves. As a result, an access node 105 may include multiple ANFs 305 and UEFs 310.

For example, access node 105*f* may include multiple instances of a UEF 310, where the UEF 310 may communicate with the ANFs 305 at access nodes 105-*e*, 105-*g*, and 105-*h*. Additionally, access nodes 105-*g* and 105-*h* may each communicate with each other using at least one ANF 305 and at least one UEF 310, and may form overlapping stars. In such cases, access node 105-*g* and access node 105-*h* may communicate over communication links 325*e* and 325*f* that provide topological redundancy for the backhaul network 300. In some cases, communication links 325*e* and 325*f* may be associated with different sets of resources, where the resources are cooperatively allocated according to a schedule established by the ANFs 305. Multiple stars may use techniques to coordinate wireless resources, which may efficiently handle system constraints (e.g., half-duplexed communications, inter-link interference, etc.). For instance, inter-link interference may be managed using spatial division multiple access (SDMA) techniques (e.g., through the use of narrow beams), and inter-node beam coordination may account for any remaining interference.

Additionally or alternatively, mobile access may be integrated into such a star topology through additional stars with UEs 115 at their leaves and an access node 105 at their center. In some cases, mobile access links may also be added to existing stars. In an example, access node 105-*i* may communicate with access node 105-*j* using communication link 325-*g*. An access node 105 may further communicate with one or more UEs 115 over communication links 325-*h* as shown at access node 105-*i*. In this example, communication links 325-*g* and 325-*h* both share the same set of wireless resources to provide integrated access and backhaul. As can be seen in FIG. 3, a range of ANF 305 and UEF 310 combinations may be instantiated in an access node 105. Additional or different combinations of UEF 310 and ANF 305 instances in access nodes 105, as well as different topologies not shown in FIG. 3, may be possible.

To coordinate timing of transmission and reception, all links may be coordinated using time synchronization, where a frame structure supported by a cellular RAT may be used. For instance, time synchronization may be achieved through a determination of timing parameters associated with another wireless node, for example, another wireless node may transmit an indication of synchronization signal transmission timing. In some examples, further coordination between wireless nodes may be used since different wireless nodes may implement multiple ANFs 305 and/or UEFs 310.

In some examples, access node 105 may include multiple node function instances, which may further use a routing function that makes decisions on forwarding of data among node functions residing on the same node. The routing function may be executed or instantiated, for example, on any one of a number of protocol layers (e.g., the routing function may be executed on an Internet Protocol (IP) layer). In some cases, the access node 105 may access a routing table and may forward data between node functions based on the routing table. Additionally or alternatively, a routing function or a routing table may be used to forward data between different access nodes 105.

In some examples, a large-scale or network-wide time division multiplexed (TDM) schedule (e.g., a super schedule) may be used to assign resources to the various access nodes 105 within in a coordinated manner. For example, adjacent stars (e.g., different stars with leaves that share at least one node) or overlapping stars (e.g., stars with one common leaves) may use different wireless resources. At the same time, disjointed stars (e.g., stars that are neither adjacent nor overlapping) may reuse the same wireless resources. The schedule may be followed by all participating access nodes 105 through a mutual time synchronization and the frame structure, which may be defined by the RAT.

Figure 4:
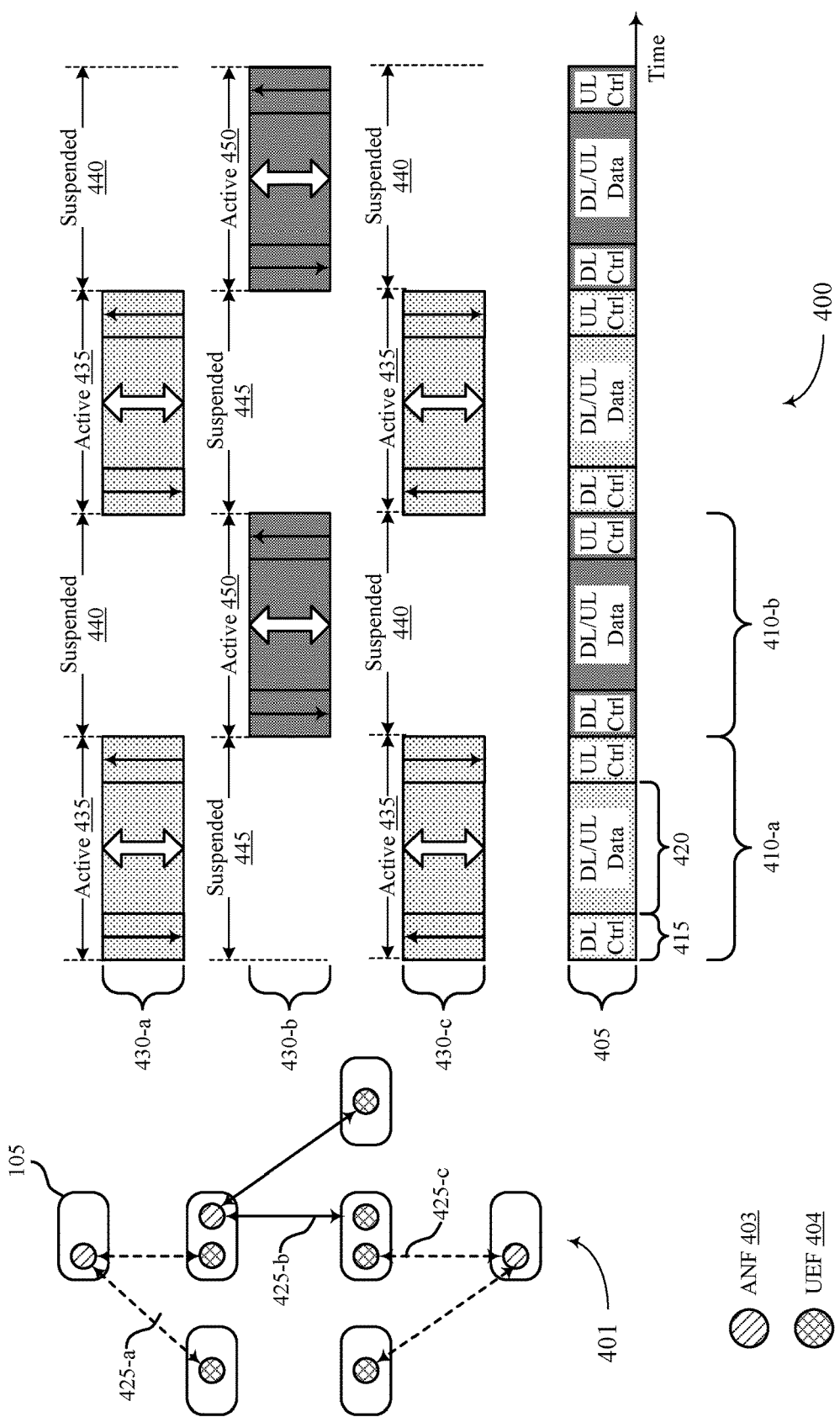
FIG. 4 illustrates an example of a schedule used in a system that supports coordination of signaling and resource allocation in a wireless network using radio access technology in accordance with aspects of the present disclosure.

FIG. 4 illustrates an example of a schedule 400 used in a system for coordination of signaling and resource allocation in a network using RAT. Schedule 400 may illustrate an example of time-multiplexing wireless resources for multiple access nodes that form a mesh topology. For example, schedule 400 may illustrate a schedule used by a backhaul network 401 that comprises seven access nodes 105 that form three different stars.

Schedule 400 may be aligned to a synchronized and slotted frame structure for UL and DL transmissions. For example, a frame structure 405 may be supported by a RAT (e.g., a mmW RAT) and be used to coordinate signaling and resource allocation in a backhaul network, such as backhaul network 200 or backhaul network 300 as described with reference to FIGS. 2 and 3, or backhaul network 401. Within frame structure 405, a frame may occupy a time slot 410, and each frame may include control portions 415 (e.g., a portion that includes DL control and a portion that includes UL control at the beginning and end of the frame, respectively) and a data portion 420 (e.g., a portion that is used for the transmission of UL and DL data). For instance, each time slot 410 may include a DL control channel in a first sub-slot, a DL or UL data channel in a second sub-slot, and an UL control channel in a third sub-slot. In some examples, a time slot 410 may represent a frame or a subframe. In the example of schedule 400, DL data and control may be transmitted from an ANF 403 to a UEF 404, and UL data and control may be transmitted from a UEF 404 to an ANF 403.

In some examples, the schedule 400 may be based on a network topology (e.g., the topology of backhaul network 401), where the schedule 400 divides resources into multiple groups (e.g., respective groups for ANFs 403 and UEFs 404). The schedule 400 may assign alternating time slots 410 to these resources, where a first time slot 410*a* is associated with a first set of wireless resources and a second time slot 410-*b* is associated with a second set of wireless resources.

An access node 105 within backhaul network 401 may communicate with one or more other access nodes 105 using one or more node functions, such as an ANF 403 and a UEF 404, as described with reference to FIGS. 2 and 3. Accordingly, communication may take place between a first access node 105 using an ANF 403 and one or more access nodes 105 using a UEF 404 over communication links 225-*a*. Similarly, a second access node 105 and a third access node 105 using an ANF 403 may respectively communicate with one or more other access nodes 105 over communication links 425-*b* and 425-*c*. In some examples, the communication links 425 may be associated with respective sets of resources. That is, communication links 425*a* and communication links 425-*c* may use the first set of wireless resources and communication link 425-*b* may use the second set of wireless resources.

A node function may operate according to an active mode and a suspended mode based on schedule 400. That is, a node function may be active or suspended in respective time slots 410 according to a resource schedule 430. As an example, access nodes 105 using communication links 425*a* and 425-*c* (and using the same set of resources) may communicate using resource schedule 430*a* and resource schedule 430-*c*, respectively. In such cases, the access nodes 105 may communicate using control portions 415 and data portions 420 in the first time slot 410*a* during an ANF 403 active mode 435, and may refrain from transmitting during the second time slot 410-*b* in an ANF 403 suspended mode 440. Further, an ANF 403 at an access node 105 using communication links 425-*b* may refrain from communicating during an ANF 403 suspended mode 445 in the first time slot 410*a*, but communicate according to resource schedule 430-*b* during an ANF 403 active mode 450 in second time slot 410-*b*.

In some cases, an ANF 403 may use every resource schedule 430 for designated time slots 410 for communication between the UEFs 404 that the ANF 403 controls. In some cases, within each resource allocation established by the schedule 400, each ANF 403 may schedule resources among one or more UEFs 404, and an access node 105 may further sub-schedule resources among multiple UEs 115 (not shown). In some examples, other resource allocation schemes for the schedule may be possible. That is, more time slots 410 may be allocated to a wireless resource than for another wireless resource. Additionally or alternatively, a greater number of resources may be scheduled based on a network topology.

Figure 5:
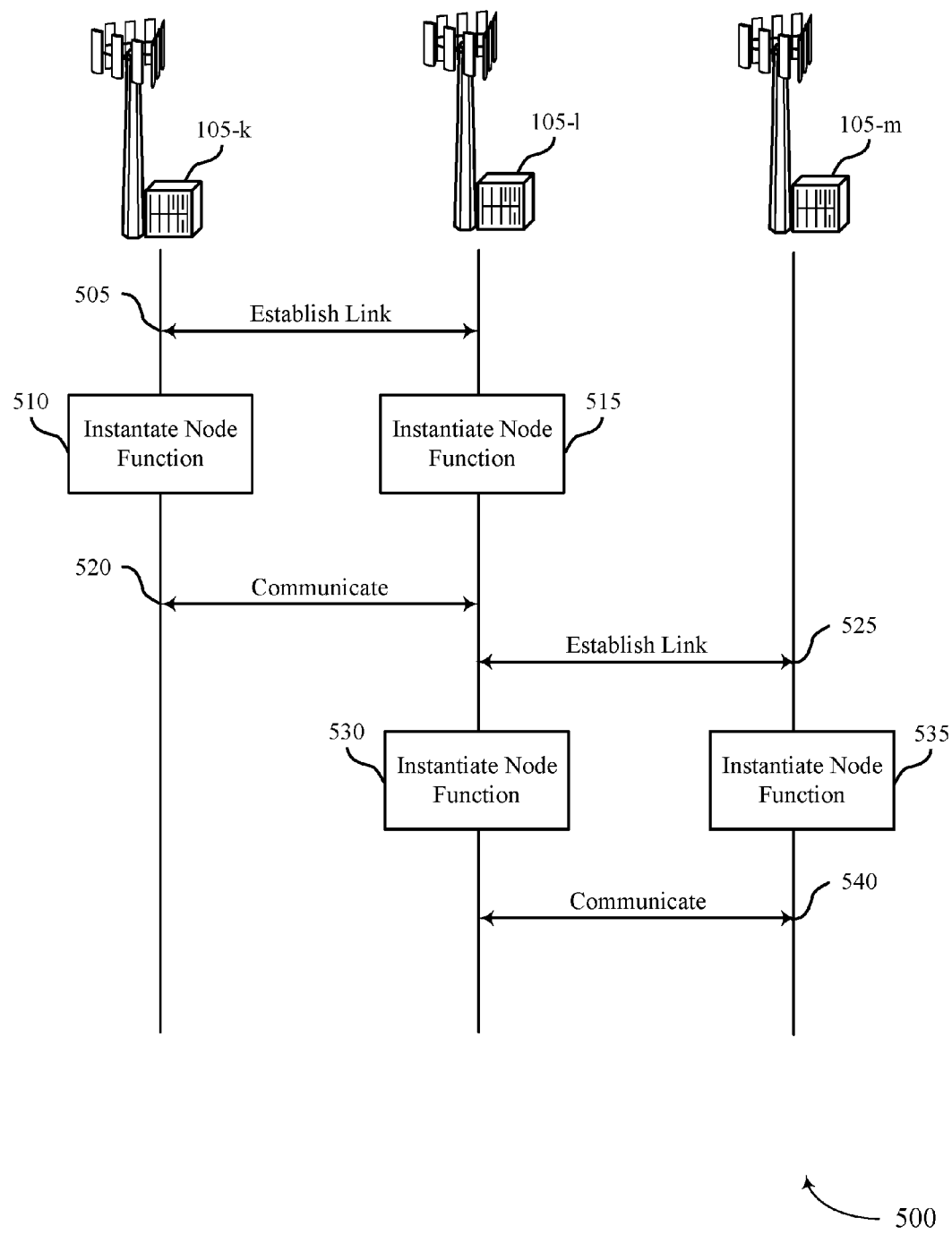
FIG. 5 illustrates an example of a process flow in a system that supports coordination of signaling and resource allocation in a wireless network using radio access technology in accordance with aspects of the present disclosure.

FIG. 5 illustrates an example of a process flow 500 in a system that supports coordination of signaling and resource allocation in a wireless network using RAT. Process flow 500 may include multiple wireless nodes, such as access node 105-*k*, access node 105-*l*, and access node 105-*m*.

At step 505, access node 105-*k* and access node 105-*l* may establish one or more communication links with a corresponding one or more other wireless nodes using a RAT that supports a synchronized and slotted frame structure for UL transmissions and DL transmissions. Accordingly, the access nodes 105 may form a star topology as described with reference to FIGS. 2 through 4. In some cases, the one or more communication links comprise a single link between the wireless node and another wireless node (e.g., the star formed by the access nodes 105 may have only one leaf). In some examples, one of the access nodes 105 are coupled with a wireline backhaul link for a network, and the one or more communication links comprise backhaul links. In some cases, access node 105-$k$ and access node 105-$l$ include backhaul access nodes. Additionally, the RAT may include a mmW RAT.

At steps 510 and 515, the respective access nodes 105 may instantiate one or more node functions based at least in part on node functions at the other access node 105, wherein the one or more node functions are selected from an ANF and a UEF. For example, access node 105-$k$ may instantiate an ANF and access node 105-$l$ may instantiate a UEF.

At step 520, access node 105-$k$ and access node 105-$l$ may communicate according to an active mode or a suspended mode using the one or more node functions. In some examples, the access nodes 105 may switch between the active mode and the suspended mode designated for each of the one or more node functions based as least in part on a schedule, wherein the schedule is aligned with the slotted frame structure.

In some examples, access node 105-$k$ may instantiate an ANF and schedule data traffic, during the active mode, over the one or more communication links. Additionally or alternatively, access node 105-$k$ may transmit DL data on the one or more communication links, and receive UL data on the one or more communication links. In some cases, access node 105-$k$ may instantiate an ANF and communicate with one or more UEs 115 and forward data between the one or more UEs 115 and one or more other wireless nodes based at least in part on the communication. In some examples, communicating with the one or more UEs 115 and the communicating using the one or more node functions shares a same set of wireless resources.

In some examples, when access node 105-$l$ instantiates a UEF, access node 105-$l$ may follow scheduling instructions (e.g., scheduling instructions received from the ANF instance at access node 105-$k$), during the active mode, for data traffic over the one or more communication links. Additionally or alternatively, access node 105-$l$ may transmit UL data on the one or more communication links, and receive DL data on the one or more communication links.

At step 525, access node 105-$l$ may further establish one or more additional communication links with access node 105-$m$ using the RAT. Access node 105-$l$ and access node 105-$m$ may then instantiate, at steps 530 and 535, respectively, one or more node functions based at least in part on node functions at the other access node 105. In some examples, the access node 105-$l$ may instantiate at least one UEF for communicating with access node 105-$m$ and instantiate at least one ANF for communicating with access node 105-$m$. Additionally or alternatively, access node 105-$l$ may instantiate at least a first UEF for communicating with access node 105-$k$ and instantiate at least a second UEF for communicating with access node 105-$m$. In some cases, access node 105-$l$ may instantiate the UEF upon confirming that access node 105-$k$ or access node 105-$m$ are or will be instantiated as ANFs. At step 540, access node 105-$l$ and access node 105-$m$ may communicate according to an active mode or a suspended mode using the one or more node functions. In some examples, the access nodes 105 may switch between the active mode and the suspended mode designated for each of the one or more node functions based as least in part on a schedule, wherein the schedule is aligned with the slotted frame structure.

In some examples, the access nodes 105 may access a routing table associated with the one or more other access nodes 105 and forward data between the access node 105 and one or more other access nodes based at least in part on the routing table. In some cases, an access node 105 may instantiate a routing function associated with the one or more other access nodes 105 and forward data between the wireless node and the one or more other access nodes 105 in accordance with the routing function.

Additionally or alternatively, the access nodes 105 may access a routing table associated with the one or more node functions and forward data between the access node 105 and one or more other access nodes based at least in part on the routing table. In some cases, an access node 105 may instantiate a routing function associated with the one or more node functions and forward data between the one or more node functions in accordance with the routing function.

Figure 6:
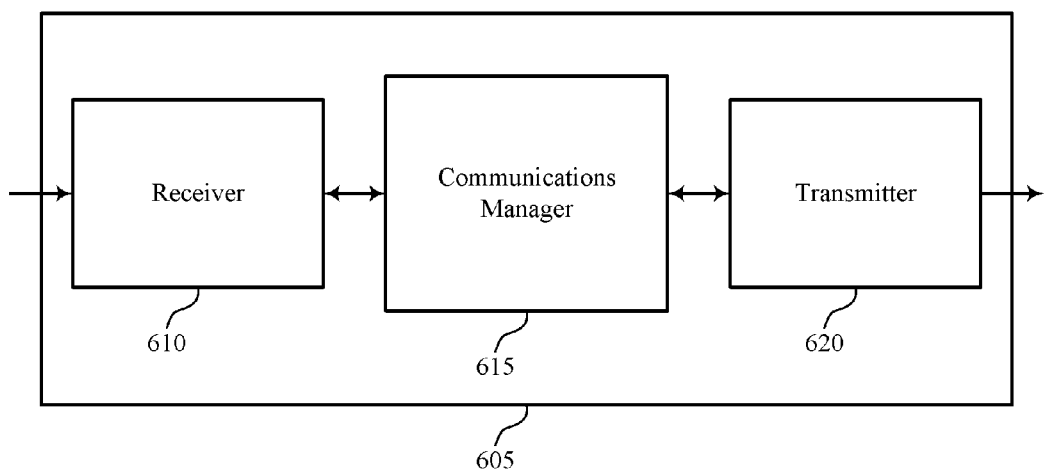
FIGS. 6 through 8 show block diagrams of a device that supports coordination of signaling and resource allocation in a wireless network using radio access technology in accordance with aspects of the present disclosure.

FIG. 6 shows a block diagram 600 of a wireless device 605 that supports coordination of signaling and resource allocation in a wireless network using RAT in accordance with various aspects of the present disclosure. Wireless device 605 may be an example of aspects of an access node 105 or a base station as described with reference to FIG. 1. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to coordination of signaling and resource allocation in a wireless backhaul network using RAT, etc.). Information may be passed on to other components of the device. The receiver 610 may be an example of aspects of the transceiver 935 described with reference to FIG. 9. In some cases, receiver 610 may receive UL data on the one or more communication links and receive DL data on the one or more communication links.

Communications manager 615 may be an example of aspects of the communications manager 915 described with reference to FIG. 9. In some cases, communications manager 615 may establish one or more communication links with a corresponding one or more other wireless nodes using a RAT that supports a synchronized and slotted frame structure for UL transmissions and DL transmissions, instantiate, at the wireless node, one or more node functions based on node functions at the one or more other wireless nodes, where the one or more node functions are selected from an ANF and a UEF, and communicate, with the one or more other wireless nodes, according to an active mode or a suspended mode using the one or more node functions.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas. In some examples, transmitter 620 may transmit DL data on the one or more communication links and transmit UL data on the one or more communication links.

Figure 7:
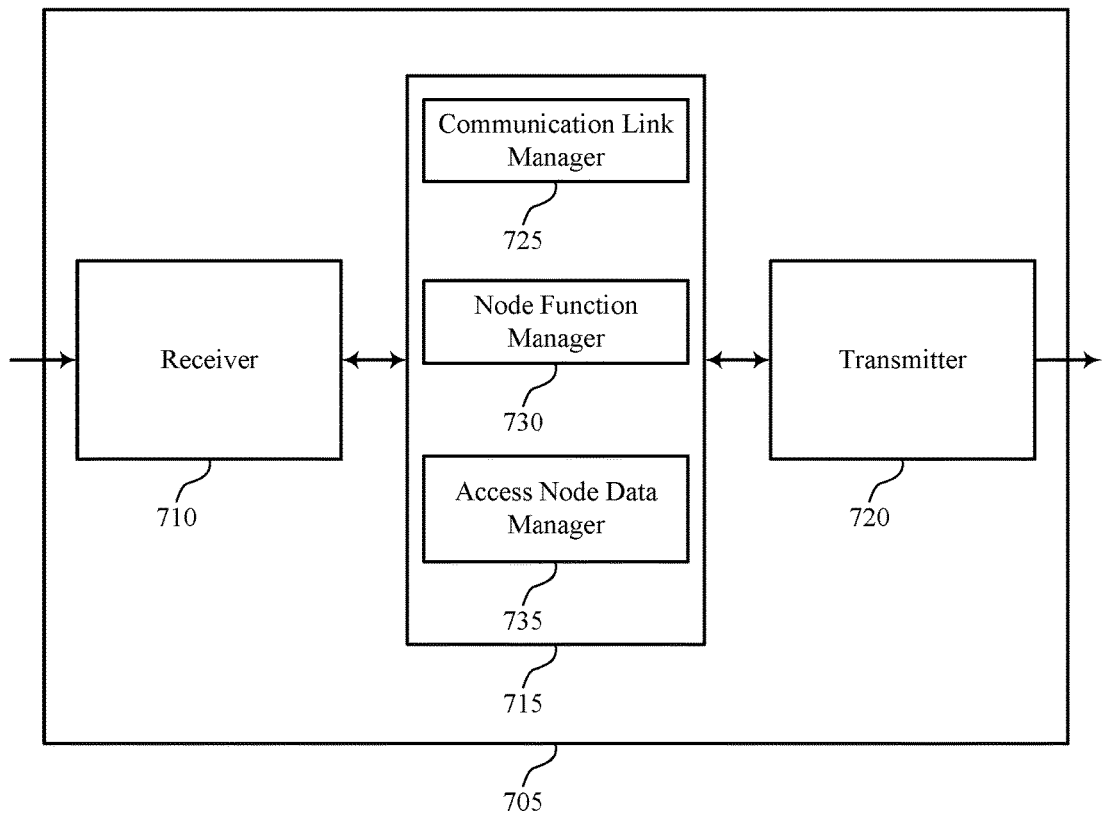

FIG. 7 shows a block diagram 700 of a wireless device 705 that supports coordination of signaling and resource allocation in a wireless network using RAT in accordance with various aspects of the present disclosure. Wireless device 705 may be an example of aspects of a wireless device 605, an access node 105, or a base station as described with reference to FIGS. 1 and 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to coordination of signaling and resource allocation in a wireless backhaul network using RAT, etc.). Information may be passed on to other components of the device. The receiver 710 may be an example of aspects of the transceiver 935 described with reference to FIG. 9.

Communications manager 715 may be an example of aspects of the communications manager 915 described with reference to FIG. 9. Communications manager 715 may also include communication link manager 725, node function manager 730, and access node data manager 735. Communication link manager 725 may establish one or more communication links with a corresponding one or more other wireless nodes using a RAT that supports a synchronized and slotted frame structure for UL transmissions and DL transmissions. In some cases, the one or more communication links includes a single link between the wireless node and another wireless node. In some cases, the wireless node or the one or more other wireless nodes are coupled with a wireline backhaul link for a network. In some cases, the one or more communication links include backhaul links. In some cases, the wireless node and the one or more other wireless nodes include backhaul access nodes. In some cases, the RAT includes a millimeter wave RAT.

Node function manager 730 may instantiate, at the wireless node, one or more node functions based on node functions at the one or more other wireless nodes, where the one or more node functions are selected from an ANF and a UEF; instantiate the UEF upon confirming that the one or more other wireless nodes are instantiated or will be instantiated as ANFs, instantiate the UEF; instantiate at least one ANF for communicating with the first wireless node; and instantiate at least a first UEF for communicating with a first wireless node of the one or more other wireless nodes. In some cases, the node function manager 730 may instantiate at least a second UEF for communicating with a second wireless node of the one or more other wireless nodes, where the first wireless node is different than the second wireless node. In other examples, the node function manager 730 may instantiate the ANF upon confirming that the one or more other wireless nodes are instantiated or will be instantiated as UEFs and may, in some cases, instantiate at least one UEF for communicating with a first wireless node of the one or more other wireless nodes.

Access node data manager 735 may communicate, with the one or more other wireless nodes, according to an active mode or a suspended mode using the one or more node functions and switch between the active mode and the suspended mode designated for each of the one or more node functions based as least in part on a schedule, where the schedule is aligned with the slotted frame structure.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
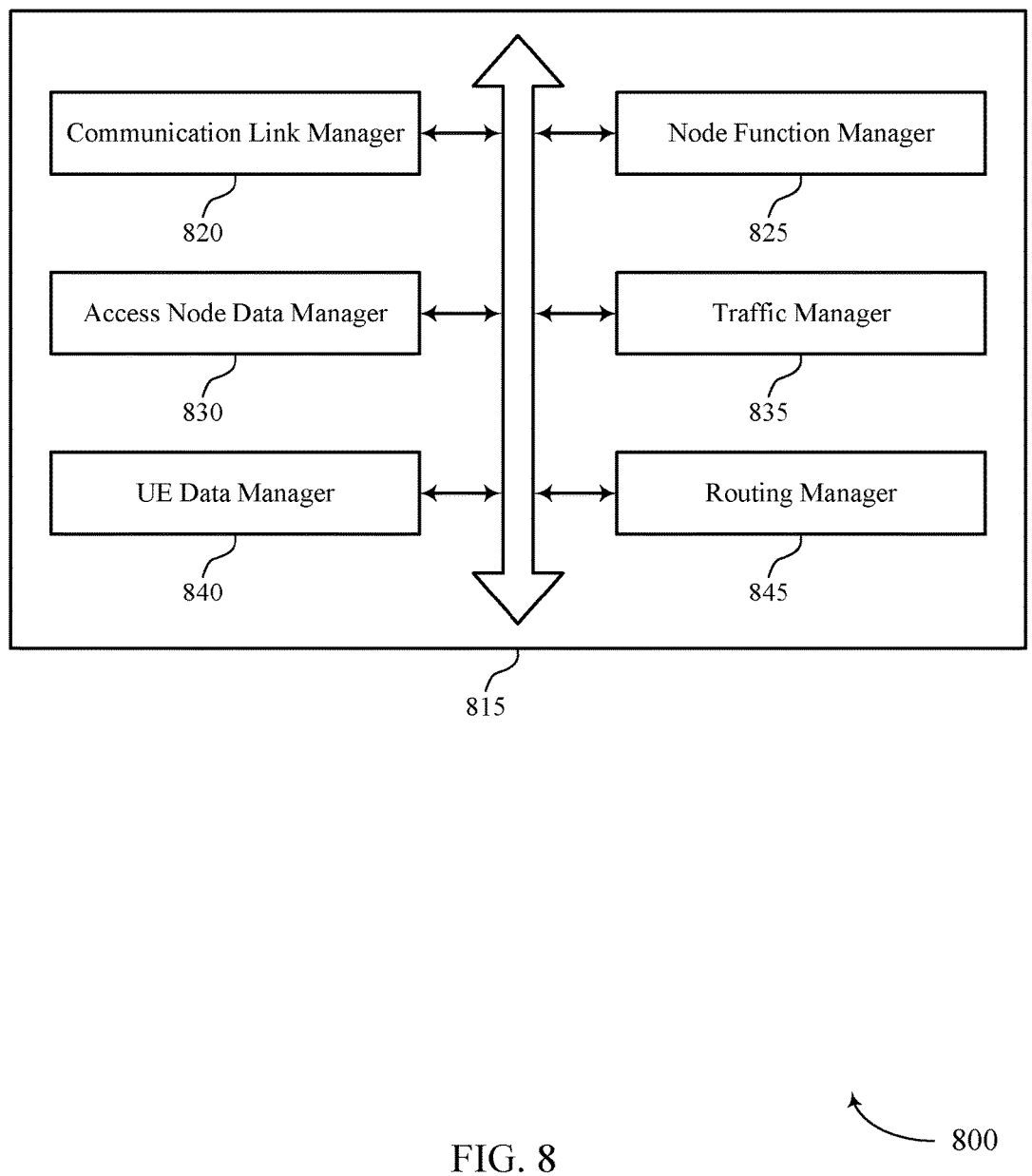

FIG. 8 shows a block diagram 800 of a communications manager 815 that supports coordination of signaling and resource allocation in a wireless network using RAT in accordance with various aspects of the present disclosure. The communications manager 815 may be an example of aspects of a communications manager 615, a communications manager 715, or a communications manager 915 described with reference to FIGS. 6, 7, and 9. The communications manager 815 may include communication link manager 820, node function manager 825, access node data manager 830, traffic manager 835, UE data manager 840, and routing manager 845. Each of these modules may communicate, directly or indirectly, with one another (e.g., via one or more buses).

Communication link manager 820 may establish one or more communication links with a corresponding one or more other wireless nodes using a RAT that supports a synchronized and slotted frame structure for UL transmissions and DL transmissions. In some cases, the one or more communication links includes a single link between the wireless node and another wireless node. In some cases, the wireless node or the one or more other wireless nodes are coupled with a wireline backhaul link for a network. In some cases, the one or more communication links include backhaul links. In some cases, the wireless node and the one or more other wireless nodes include backhaul access nodes. In some cases, the RAT includes a millimeter wave RAT.

Node function manager 825 may instantiate, at the wireless node, one or more node functions based on node functions at the one or more other wireless nodes, where the one or more node functions are selected from an ANF and a UEF; instantiate the UEF upon confirming that the one or more other wireless nodes are instantiated or will be instantiated as ANFs, instantiate the UEF; instantiate at least one ANF for communicating with the first wireless node; and instantiate at least a first UEF for communicating with a first wireless node of the one or more other wireless nodes. In some cases, the node function manager 825 may instantiate at least a second UEF for communicating with a second wireless node of the one or more other wireless nodes, where the first wireless node is different than the second wireless node. In other examples, the node function manager 825 may instantiate the ANF upon confirming that the one or more other wireless nodes are instantiated or will be instantiated as UEFs and may, in some cases, instantiate at least one UEF for communicating with a first wireless node of the one or more other wireless nodes.

Access node data manager 830 may communicate, with the one or more other wireless nodes, according to an active mode or a suspended mode using the one or more node functions and switch between the active mode and the suspended mode designated for each of the one or more node functions based as least in part on a schedule, where the schedule is aligned with the slotted frame structure.

Traffic manager 835 may schedule data traffic, during the active mode, over the one or more communication links; follow scheduling instructions, during the active mode, for data traffic over the one or more communication links; and forward data between the one or more UEs and the one or more other wireless nodes based on the communication. In some examples, the traffic manager 835 may forward data between the wireless node and the one or more other wireless nodes based on a routing table, and forward data between the wireless node and the one or more other wireless nodes in accordance with the routing function. Additionally or alternatively, the traffic manager 835 may forward data between the one or more node functions based on the routing table, and forward data between the one or more node functions in accordance with the routing function. UE data manager 840 may communicate with one or more UEs. In some cases, the communicating with the one or more UEs and the communicating using the one or more node functions shares a same set of wireless resources.

Routing manager 845 may access a routing table associated with the one or more other wireless nodes, instantiate a routing function associated with the one or more other wireless nodes, access a routing table associated with the one or more node functions, and instantiate a routing function associated with the one or more node functions.

Figure 9:
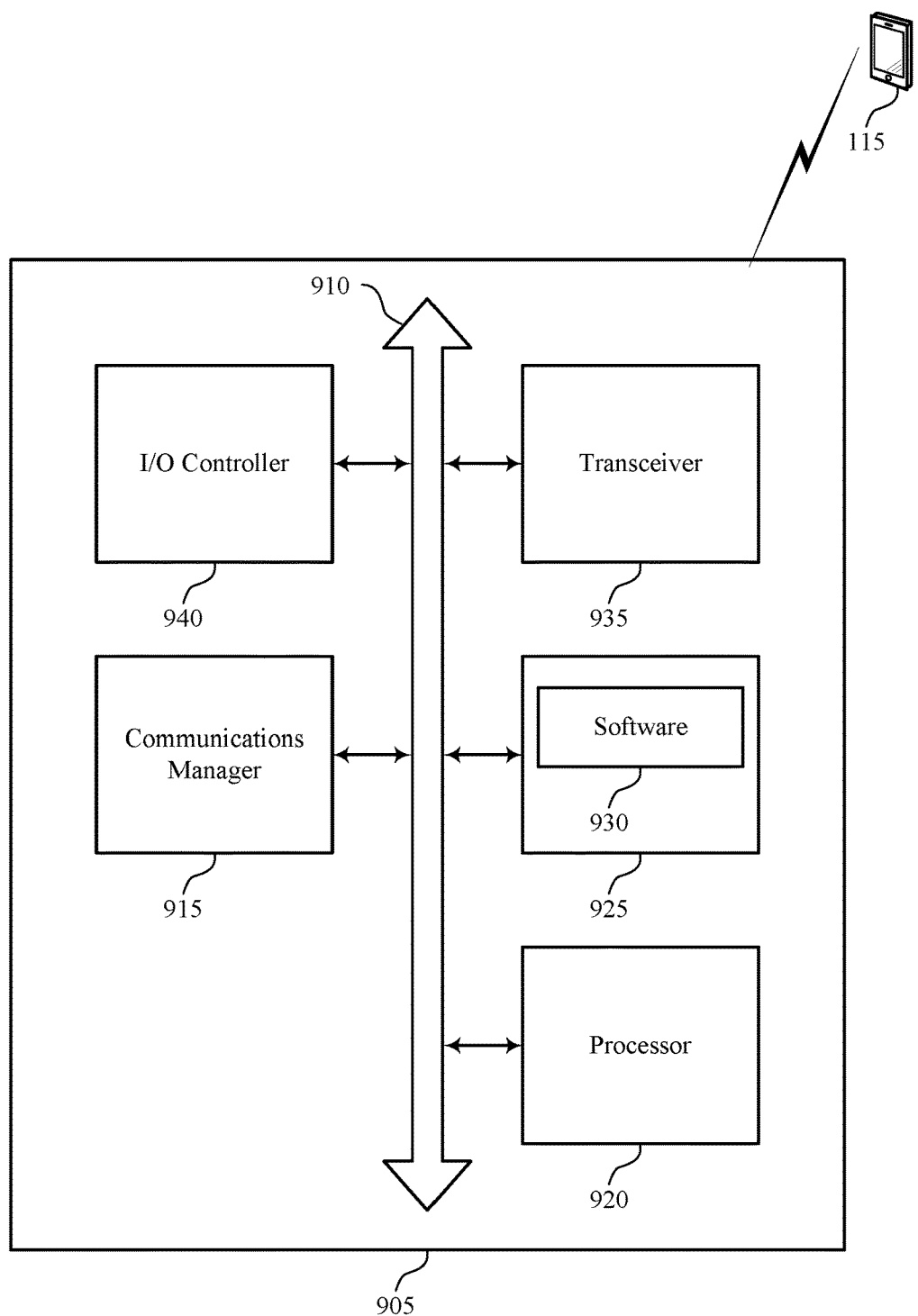
FIG. 9 illustrates a block diagram of a system including an access node that supports coordination of signaling and resource allocation in a wireless network using radio access technology in accordance with aspects of the present disclosure.

FIG. 9 shows a diagram of a system 900 including a device 905 that supports coordination of signaling and resource allocation in a wireless network using RAT in accordance with various aspects of the present disclosure. Device 905 may be an example of or include the components of wireless device 605, wireless device 705, a base station, or an access node 105 as described above (e.g., with reference to FIGS. 1, 6 and 7). Device 905 may include components for bi-directional voice and data communications including components for transmitting and receiving communications, including communications manager 915, processor 920, memory 925, software 930, transceiver 935, and I/O controller 940. These components may be in electronic communication via one or more busses (e.g., bus 910).

Processor 920 may include an intelligent hardware device (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting coordination of signaling and resource allocation in a wireless backhaul network using RAT).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support coordination of signaling and resource allocation in a wireless backhaul network using RAT. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

I/O controller 940 may manage input and output signals for device 905. I/O controller 940 may also manage peripherals not integrated into device 905. In some cases, I/O controller 940 may represent a physical connection or port to an external peripheral. In some cases, I/O controller 940 may utilize an operating system such as iOS®, ANDROID®, MS-DOS®, MS-WINDOWS®, OS/2®, UNIX®, LINUX®, or another known operating system.

Figure 10:
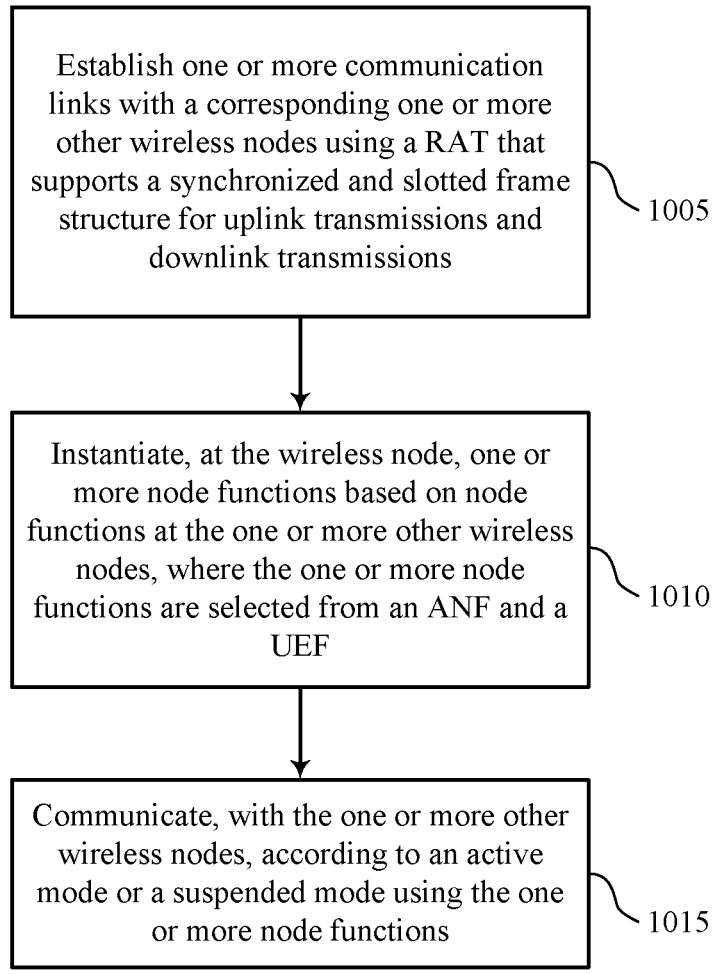
FIGS. 10 through 12 illustrate methods for coordination of signaling and resource allocation in a wireless network using radio access technology in accordance with aspects of the present disclosure.

FIG. 10 shows a flowchart illustrating a method 1000 for coordination of signaling and resource allocation in a wireless network using RAT in accordance with various aspects of the present disclosure. The operations of method 1000 may be implemented by an access node 105 or its components as described herein. For example, the operations of method 1000 may be performed by a communications manager as described with reference to FIGS. 6 through 9. In some examples, an access node 105 may execute a set of codes to control the functional elements of the device to perform the functions described below. Additionally or alternatively, the access node 105 may perform aspects of the functions described below using special-purpose hardware.

At block 1005 the access node 105 may establish one or more communication links with a corresponding one or more other wireless nodes using a RAT that supports a synchronized and slotted frame structure for UL transmissions and DL transmissions. The operations of block 1005 may be performed according to the methods described with reference to FIGS. 1 through 5. In certain examples, aspects of the operations of block 1005 may be performed by a communication link manager as described with reference to FIGS. 6 through 9.

At block 1010 the access node 105 may instantiate, at the wireless node, one or more node functions based at least in part on node functions at the one or more other wireless nodes, wherein the one or more node functions are selected from an ANF and a UEF. The operations of block 1010 may be performed according to the methods described with reference to FIGS. 1 through 5. In certain examples, aspects of the operations of block 1010 may be performed by a node function manager as described with reference to FIGS. 6 through 9.

At block 1015 the access node 105 may communicate, with the one or more other wireless nodes, according to an active mode or a suspended mode using the one or more node functions. The operations of block 1015 may be performed according to the methods described with reference to FIGS. 1 through 5. In certain examples, aspects of the operations of block 1015 may be performed by an access node data manager as described with reference to FIGS. 6 through 9.

Figure 11:
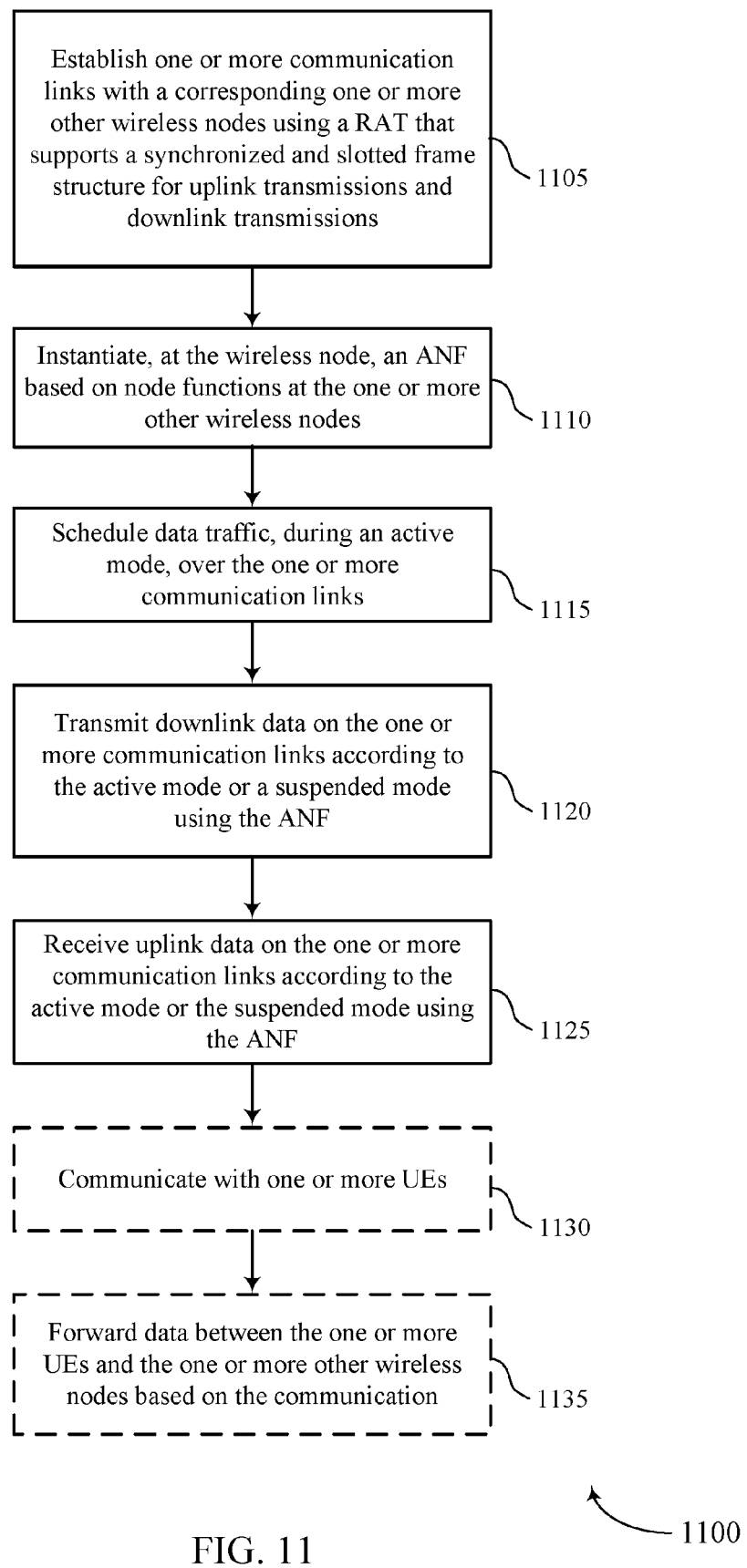

FIG. 11 shows a flowchart illustrating a method 1100 for coordination of signaling and resource allocation in a wireless network using RAT in accordance with various aspects of the present disclosure. The operations of method 1100 may be implemented by an access node 105 or its components as described herein. For example, the operations of method 1100 may be performed by a communications manager as described with reference to FIGS. 6 through 9. In some examples, an access node 105 may execute a set of codes to control the functional elements of the device to perform the functions described below. Additionally or alternatively, the access node 105 may perform aspects of the functions described below using special-purpose hardware.

At block 1105 the access node 105 may establish one or more communication links with a corresponding one or more other wireless nodes using a RAT that supports a synchronized and slotted frame structure for UL transmissions and DL transmissions. The operations of block 1105 may be performed according to the methods described with reference to FIGS. 1 through 5. In certain examples, aspects of the operations of block 1105 may be performed by a communication link manager as described with reference to FIGS. 6 through 9.

At block 1110 the access node 105 may instantiate an ANF based at least in part on node functions at the one or more other wireless nodes. The operations of block 1110 may be performed according to the methods described with reference to FIGS. 1 through 5. In certain examples, aspects of the operations of block 1110 may be performed by a node function manager as described with reference to FIGS. 6 through 9.

At block 1115 the access node 105 may schedule data traffic, during an active mode, over the one or more communication links. The operations of block 1115 may be performed according to the methods described with reference to FIGS. 1 through 5. In certain examples, aspects of the operations of block 1115 may be performed by a traffic manager as described with reference to FIGS. 6 through 9.

At block 1120 the access node 105 may transmit DL data on the one or more communication links according to the active mode or a suspended mode using the ANF. For example, the access node 105 may switch the ANF between the active and suspended modes according to a schedule, where the schedule is aligned with the slotted frame structure as described with reference to FIG. 4. The operations of block 1120 may be performed according to the methods described with reference to FIGS. 1 through 5. In certain examples, aspects of the operations of block 1120 may be performed by a transmitter as described with reference to FIGS. 6 through 9.

At block 1125 the access node 105 may receive UL data on the one or more communication links according to the active mode or the suspended mode using the ANF. For example, the access node 105 may receive UL data from the one or more other wireless nodes according to the schedule, as described with reference to FIG. 4. The operations of block 1125 may be performed according to the methods described with reference to FIGS. 1 through 5. In certain examples, aspects of the operations of block 1125 may be performed by a receiver as described with reference to FIGS. 6 through 9.

At block 1130 the access node 105 may optionally communicate with one or more UEs 115. In some cases, the access node 105 may manage mobile access for a number of UEs 115, where the access node 105 allocates resources among the UEs 115. In some cases, the resources used for communicating with the UEs 115 may include the same resources for communicating with one or more node functions (such as a UEF). The operations of block 1150 may be performed according to the methods described with reference to FIGS. 1 through 5. In certain examples, aspects of the operations of block 1150 may be performed by a UE communications manager as described with reference to FIGS. 6 through 9.

At block 1135 the access node 105 may optionally forward data between the one or more UEs 115 and the one or more other wireless nodes based at least in part on the communication. The operations of block 1135 may be performed according to the methods described with reference to FIGS. 1 through 5. In certain examples, aspects of the operations of block 1135 may be performed by a traffic manager as described with reference to FIGS. 6 through 9.

Figure 12:
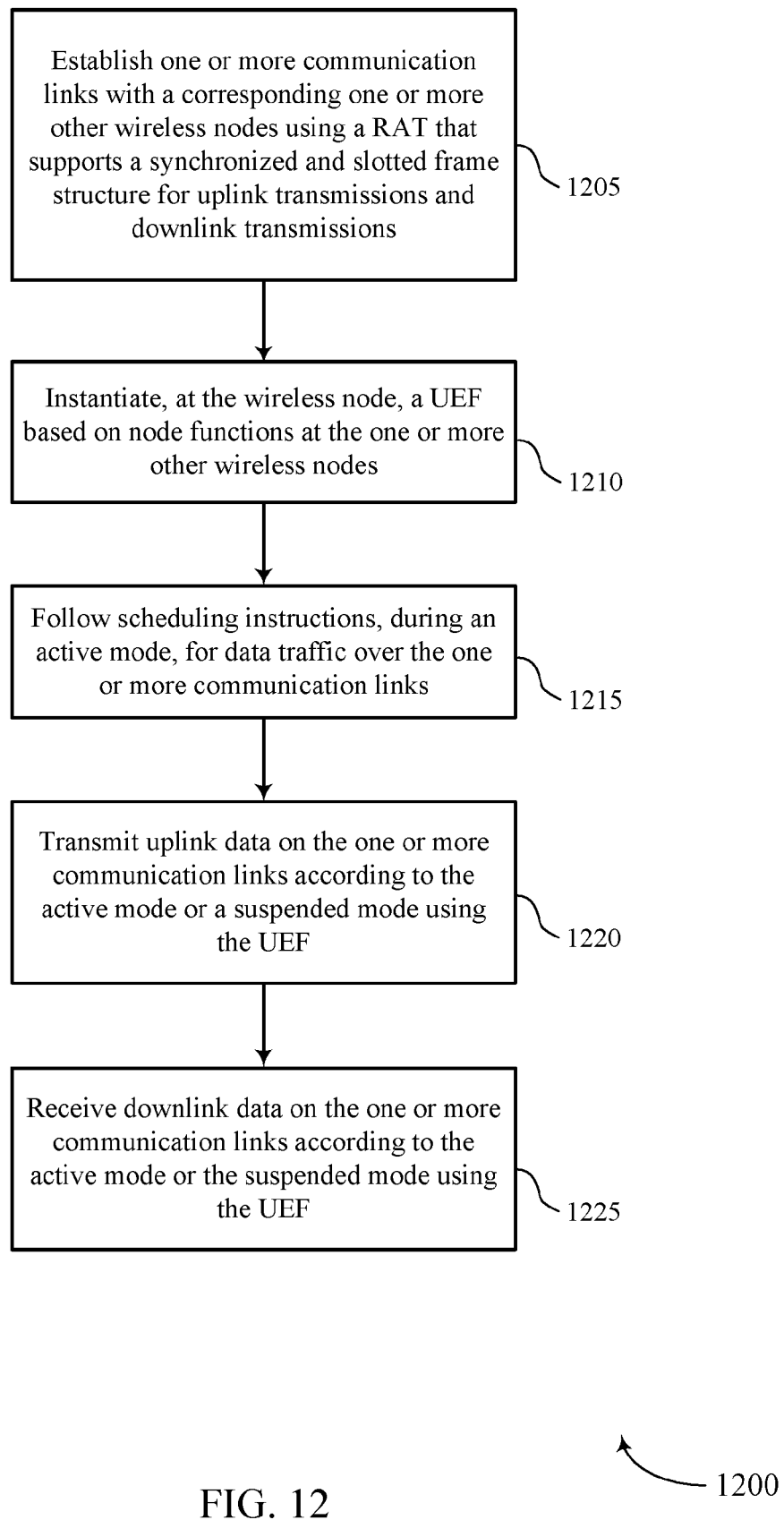

FIG. 12 shows a flowchart illustrating a method 1200 for coordination of signaling and resource allocation in a wireless network using RAT in accordance with various aspects of the present disclosure. The operations of method 1200 may be implemented by an access node 105 or its components as described herein. For example, the operations of method 1200 may be performed by a communications manager as described with reference to FIGS. 6 through 9. In some examples, an access node 105 may execute a set of codes to control the functional elements of the device to perform the functions described below. Additionally or alternatively, the access node 105 may perform aspects of the functions described below using special-purpose hardware.

At block 1205 the access node 105 may establish one or more communication links with a corresponding one or more other wireless nodes using a RAT that supports a synchronized and slotted frame structure for UL transmissions and DL transmissions. The operations of block 1205 may be performed according to the methods described with reference to FIGS. 1 through 5. In certain examples, aspects of the operations of block 1205 may be performed by a communication link manager as described with reference to FIGS. 6 through 9.

At block 1210 the access node 105 may instantiate a UEF based on node functions at the one or more other wireless devices. The operations of block 1210 may be performed according to the methods described with reference to FIGS. 1 through 5. In certain examples, aspects of the operations of block 1210 may be performed by a node function manager as described with reference to FIGS. 6 through 9.

At block 1215 the access node 105 may follow scheduling instructions, during an active mode, for data traffic over the one or more communication links. For instance, the access node 105 may follow scheduling instructions received from another wireless node 105 that provides coordination of signaling based on a synchronized schedule. The operations of block 1215 may be performed according to the methods described with reference to FIGS. 1 through 5. In certain examples, aspects of the operations of block 1215 may be performed by a traffic manager as described with reference to FIGS. 6 through 9.

At block 1220 the access node 105 may transmit UL data on the one or more communication links according to the active mode or a suspended mode using the UEF. For example, the access node 105 may switch the UEF between the active and suspended modes according to a schedule, where the schedule is aligned with the slotted frame structure as described with reference to FIG. 4. The operations of block 1220 may be performed according to the methods described with reference to FIGS. 1 through 5. In certain examples, aspects of the operations of block 1220 may be performed by a transmitter as described with reference to FIGS. 6 through 9.

At block 1225 the access node 105 may receive DL data on the one or more communication links according to the active mode or the suspended mode using the UEF. For example, the access node 105 may receive DL data from the one or more other wireless nodes according to the schedule, as described with reference to FIG. 4. The operations of block 1225 may be performed according to the methods described with reference to FIGS. 1 through 5. In certain examples, aspects of the operations of block 1225 may be performed by a receiver as described with reference to FIGS. 6 through 9.

In some examples, aspects from two or more of the methods 1000, 1100, or 1200 described with reference to FIG. 10, 11, or 12 may be combined. It should be noted that the methods 1000, 1100, and 1200 are just example implementations, and that the operations of the methods 1000, 1100, or 1200 may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations or access nodes.

The wireless communications system or systems described herein may include a heterogeneous LTE/LTE-A network in which different types of evolved node B (eNBs) provide coverage for various geographical regions. For example, each access node, eNB, or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, an access node, a radio transceiver, a NodeB, eNodeB (eNB), Home NodeB, a Home eNodeB, or some other suitable terminology. The geographic coverage area for an access node may be divided into sectors making up only a portion of the coverage area. The wireless communications system or systems described herein may include access nodes of different types (e.g., macro or small cell access nodes). The UEs described herein may be able to communicate with various types of access nodes and network equipment including macro eNBs, small cell eNBs, relay access nodes, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered access node, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of access nodes and network equipment including macro eNBs, small cell eNBs, relay access nodes, and the like.

The wireless communications system or systems described herein may support synchronous or asynchronous operation. For synchronous operation, the access nodes may have similar frame timing, and transmissions from different access nodes may be approximately aligned in time. For asynchronous operation, the access nodes may have different frame timing, and transmissions from different access nodes may not be aligned in time. The techniques described herein may be used for either synchronous or asynchronous operations.

The DL transmissions described herein may also be called forward link transmissions while the UL transmissions may also be called reverse link transmissions. Each communication link described herein—including, for example, wireless communications system 100 and backhaul network 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless node, comprising:

establishing one or more communication links with a corresponding one or more other wireless nodes using a radio access technology (RAT) that supports a network super-schedule for the wireless node and the one or more other wireless nodes;

operating, at the wireless node, according to a first node function of a plurality of node functions during a first time slot of a slotted frame structure according to the network super-schedule, wherein each node function of the plurality of node functions comprises either an access node function (ANF) active mode or a user equipment function (UEF) active mode, the ANF active mode supporting scheduling data traffic for at least one other wireless node operating in a UEF active mode and the UEF active mode supporting following scheduling instructions from at least one other wireless node operating in an ANF active mode;
operating according to a suspended mode of the first node function during a second time slot of the slotted frame structure according to the network super-schedule; and
operating according to an active mode of a second node function of the plurality of node functions during the second time slot according to the network super-schedule.

2. The method of claim 1, further comprising:
operating according to the ANF active mode; and
scheduling data traffic, during the ANF active mode, over the one or more communication links.

3. The method of claim 1, further comprising:
operating according to the UEF active mode; and
following scheduling instructions, during the UEF active mode, for data traffic over the one or more communication links.

4. The method of claim 1, further comprising:
operating according to the ANF active mode;
transmitting downlink data on the one or more communication links; and
receiving uplink data on the one or more communication links.

5. The method of claim 1, further comprising:
operating according to the UEF active mode;
transmitting uplink data on the one or more communication links; and
receiving downlink data on the one or more communication links.

6. The method of claim 1, further comprising:
operating according to the ANF active mode;
communicating with one or more user equipment (UEs); and
forwarding data between the one or more UEs and the one or more other wireless nodes based at least in part on the communication.

7. The method of claim 6, further comprising:
communicating, with the one or more other wireless nodes, according to an active mode of the plurality of node functions, wherein the communicating with the one or more UEs and the communicating according to the active mode share a same set of wireless resources.

8. The method of claim 1, further comprising:
operating according to at least one UEF active mode for communicating with a first wireless node of the one or more other wireless nodes; and
operating according to at least one ANF active mode for communicating with the first wireless node.

9. The method of claim 1, further comprising:
operating according to at least a first UEF active mode for communicating with a first wireless node of the one or more other wireless nodes; and
operating according to at least a second UEF active mode for communicating with a second wireless node of the one or more other wireless nodes, wherein the first wireless node is different than the second wireless node.

10. The method of claim 1, further comprising:
operating according to the ANF active mode upon confirming that the one or more other wireless nodes are operating or are to be operated in a UEF active mode.

11. The method of claim 1, further comprising:
operating according to the UEF active mode upon confirming that the one or more other wireless nodes are operating or are to be operated in an ANF active mode.

12. The method of claim 1, further comprising:
accessing a routing table associated with the one or more other wireless nodes; and
forwarding data between the wireless node and the one or more other wireless nodes based at least in part on the routing table.

13. The method of claim 1, further comprising:
operating according to a routing function associated with the one or more other wireless nodes; and
forwarding data between the wireless node and the one or more other wireless nodes in accordance with the routing function.

14. The method of claim 1, further comprising:
accessing a routing table associated with the plurality of node functions; and
forwarding data between the plurality of node functions based at least in part on the routing table.

15. The method of claim 1, further comprising:
operating according to a routing function associated with the plurality of node functions; and
forwarding data between the plurality of node functions in accordance with the routing function.

16. The method of claim 1, wherein the one or more communication links comprises a single link between the wireless node and another wireless node.

17. The method of claim 1, wherein the wireless node or the one or more other wireless nodes are coupled with a wireline backhaul link for a network.

18. The method of claim 1, wherein the one or more communication links comprise backhaul links.

19. The method of claim 1, wherein the wireless node and the one or more other wireless nodes comprise backhaul access nodes.

20. The method of claim 1, wherein the RAT comprises a millimeter wave RAT.

21. An apparatus for wireless communication at a wireless node, comprising:
means for establishing one or more communication links with a corresponding one or more other wireless nodes using a radio access technology (RAT) that supports a network super-schedule for the wireless node and the one or more other wireless nodes;
means for operating, at the wireless node, according to a first node function of a plurality of node functions during a first time slot of a slotted frame structure according to the network super-schedule, wherein each node function of the plurality of node functions comprises either an access node function (ANF) active mode or a user equipment function (UEF) active mode, the ANF active mode supporting scheduling data traffic for at least one other wireless node operating in a UEF active mode and the UEF active mode supporting following scheduling instructions from at least one other wireless node operating in an ANF active mode;
means for operating according to a suspended mode of the first node function during a second time slot of the slotted frame structure according to the network super-schedule; and
means for operating according to an active mode of a second node function of the plurality of node functions during the second time slot according to the network super-schedule.

22. The apparatus of claim 21, further comprising:
means for operating according to the ANF active mode;
means for scheduling data traffic, during the ANF active mode, over the one or more communication links;
means for transmitting downlink data on the one or more communication links; and means for receiving uplink data on the one or more communication links.

23. The apparatus of claim 21, further comprising:
means for operating according to the UEF active mode;
means for following scheduling instructions, during the UEF active mode, for data traffic over the one or more communication links;
means for transmitting uplink data on the one or more communication links; and
means for receiving downlink data on the one or more communication links.

24. The apparatus of claim 21, further comprising:
means for operating according to the ANF active mode;
means for communicating with one or more user equipment (UEs);
means for communicating, with the one or more other wireless nodes, according to an active mode of the plurality of node functions, wherein the means for communicating with the one or more UEs and the means for communicating according to the active mode share a same set of wireless resources; and
means for forwarding data between the one or more UEs and the one or more other wireless nodes based at least in part on the communication.

25. The apparatus of claim 21, further comprising:
means for operating according to at least one UEF active mode for communicating with a first wireless node of the one or more other wireless nodes; and
means for operating according to at least one ANF active mode for communicating with the first wireless node.

26. The apparatus of claim 21, further comprising:
means for operating according to at least a first UEF active mode for communicating with a first wireless node of the one or more other wireless nodes; and
means for operating according to at least a second UEF active mode for communicating with a second wireless node of the one or more other wireless nodes, wherein the first wireless node is different than the second wireless node.

27. The apparatus of claim 21, further comprising:
means for accessing a routing table associated with the one or more other wireless nodes; and
means for forwarding data between the wireless node and the one or more other wireless nodes based at least in part on the routing table.

28. The apparatus of claim 21, further comprising:
means for operating according to a routing function associated with the one or more other wireless nodes; and
means for forwarding data between the wireless node and the one or more other wireless nodes in accordance with the routing function.

29. The apparatus of claim 21, further comprising:
means for accessing a routing table associated with the plurality of node functions; and
means for forwarding data between the plurality of node functions based at least in part on the routing table.

30. The apparatus of claim 21, further comprising:
means for operating according to a routing function associated with the plurality of node functions; and
means for forwarding data between the plurality of node functions in accordance with the routing function.

31. An apparatus for wireless communication at a wireless node, in a system comprising:
a processor;
memory in electronic communication with the processor; and
instructions stored in the memory and operable, when executed by the processor, to cause the apparatus to:
establish one or more communication links with a corresponding one or more other wireless nodes using a radio access technology (RAT) that supports a network super-schedule for the wireless node and the one or more other wireless nodes;
operate, at the wireless node, according to a first node function of a plurality of node functions during a first time slot of a slotted frame structure according to the network super-schedule, wherein each node function of the plurality of node functions comprises either an access node function (ANF) active mode or a user equipment function (UEF) active mode, the ANF active mode supporting scheduling data traffic for at least one other wireless node operating in a UEF active mode and the UEF active mode supporting following scheduling instructions from at least one other wireless node operating in an ANF active mode;
operate according to a suspended mode the first node function during a second time slot of the slotted frame structure according to the network super-schedule; and
operate according to an active mode of a second node function of the plurality of node functions during the second time slot according to the network super-schedule.

32. The apparatus of claim 31, wherein the instructions are further executable by the processor to:
operate according to the ANF active mode;
schedule data traffic, during the ANF active mode, over the one or more communication links;
transmit downlink data on the one or more communication links; and
receive uplink data on the one or more communication links.

33. The apparatus of claim 31, wherein the instructions are further executable by the processor to:
operate according to the UEF active mode;
follow scheduling instructions, during the UEF active mode, for data traffic over the one or more communication links;
transmit uplink data on the one or more communication links; and
receive downlink data on the one or more communication links.

34. The apparatus of claim 31, wherein the instructions are further executable by the processor to:
operate according to the ANF active mode;
communicate with one or more user equipment (UEs);
communicate, with the one or more other wireless nodes, according to an active mode of the plurality of node functions, wherein the instructions executable by the processor to communicate with the one or more UEs and the instructions executable by the processor to communicate according to the active mode share a same set of wireless resources; and
forward data between the one or more UEs and the one or more other wireless nodes based at least in part on the communication.

35. The apparatus of claim 31, wherein the instructions are further executable by the processor to:
operate according to at least one UEF active mode for communicating with a first wireless node of the one or more other wireless nodes; and
operate according to at least one ANF active mode for communicating with the first wireless node.

36. The apparatus of claim 31, wherein the instructions are further executable by the processor to:
operate according to at least a first UEF active mode for communicating with a first wireless node of the one or more other wireless nodes; and
operate according to at least a second UEF active mode for communicating with a second wireless node of the one or more other wireless nodes, wherein the first wireless node is different than the second wireless node.

37. The apparatus of claim 31, wherein the instructions are further executable by the processor to:
operate according to the ANF active mode upon confirming that the one or more other wireless nodes are operating or are to be operated in a UEF active mode.

38. The apparatus of claim 31, wherein the instructions are further executable by the processor to:
operate according to the UEF active mode upon confirming that the one or more other wireless nodes are operating or are to be operated in an ANF active mode.

39. The apparatus of claim 31, wherein the instructions are further executable by the processor to:
access a routing table associated with the one or more other wireless nodes; and
forward data between the wireless node and the one or more other wireless nodes based at least in part on the routing table.

40. The apparatus of claim 31, wherein the instructions are further executable by the processor to:
operate according to a routing function associated with the one or more other wireless nodes; and
forward data between the wireless node and the one or more other wireless nodes in accordance with the routing function.

41. The apparatus of claim 31, wherein the instructions are further executable by the processor to:
access a routing table associated with the plurality of node functions; and
forward data between the plurality of node functions based at least in part on the routing table.

42. The apparatus of claim 31, wherein the instructions are further executable by the processor to:
operate according to a routing function associated with the plurality of node functions; and
forward data between the plurality of node functions in accordance with the routing function.

43. The apparatus of claim 31, wherein the one or more communication links comprises a single link between the wireless node and another wireless node.

44. The apparatus of claim 31, wherein the wireless node or the one or more other wireless nodes are coupled with a wireline backhaul link for a network.

45. The apparatus of claim 31, wherein the one or more communication links comprise backhaul links.

46. The apparatus of claim 31, wherein the wireless node and the one or more other wireless nodes comprise backhaul access nodes.

47. The apparatus of claim 31, wherein the RAT comprises a millimeter wave RAT.

48. A non-transitory computer-readable medium storing code for wireless communication at a wireless node, the code comprising instructions executable by a processor to:
establish one or more communication links with a corresponding one or more other wireless nodes using a radio access technology (RAT) that supports a network super-schedule for the wireless node and the one or more other wireless nodes;
operate, at the wireless node, according to a first node function of a plurality of node functions during a first time slot of a slotted frame structure according to the network super-schedule, wherein each node function of the plurality of node functions comprises either an access node function (ANF) active mode or a user equipment function (UEF) active mode, the ANF active mode supporting scheduling data traffic for at least one other wireless node operating in a UEF active mode and the UEF active mode supporting following scheduling instructions from at least one other wireless node operating in an ANF active mode;
operate according to a suspended mode the first node function during a second time slot of the slotted frame structure according to the network super-schedule; and
operate according to an active mode of a second node function of the plurality of node functions during the second time slot according to the network super-schedule.

49. The non-transitory computer-readable medium of claim 48, wherein the instructions are further executable by the processor to:
operate according to the ANF active mode;
schedule data traffic, during the ANF active mode, over the one or more communication links;
transmit downlink data on the one or more communication links; and
receive uplink data on the one or more communication links.

50. The non-transitory computer-readable medium of claim 48, wherein the instructions are further executable by the processor to:
operate according to the UEF active mode;
follow scheduling instructions, during the UEF active mode, for data traffic over the one or more communication links;
transmit uplink data on the one or more communication links; and
receive downlink data on the one or more communication links.

51. The non-transitory computer-readable medium of claim 48, wherein the instructions are further executable by the processor to:
operate according to the ANF active mode;
communicate with one or more user equipment (UEs);
communicate, with the one or more other wireless nodes, according to an active mode of the plurality of node functions, wherein the instructions executable by the processor to communicate with the one or more UEs and the instructions executable by the processor to communicate according to the active mode share a same set of wireless resources; and
forward data between the one or more UEs and the one or more other wireless nodes based at least in part on the communication.

52. The non-transitory computer-readable medium of claim 48, wherein the instructions are further executable by the processor to:
operate according to at least one UEF active mode for communicating with a first wireless node of the one or more other wireless nodes; and
operate according to at least one ANF active mode for communicating with the first wireless node.

53. The non-transitory computer-readable medium of claim 48, wherein the instructions are further executable by the processor to:

operate according to at least a first UEF active mode for communicating with a first wireless node of the one or more other wireless nodes; and operate according to at least a second UEF active mode for communicating with a second wireless node of the one or more other wireless nodes, wherein the first wireless node is different than the second wireless node.

54. The non-transitory computer-readable medium of claim 48, wherein the instructions are further executable by the processor to:

access a routing table associated with the one or more other wireless nodes; and forward data between the wireless node and the one or more other wireless nodes based at least in part on the routing table.

55. The non-transitory computer-readable medium of claim 48, wherein the instructions are further executable by the processor to:

operate according to a routing function associated with the one or more other wireless nodes; and forward data between the wireless node and the one or more other wireless nodes in accordance with the routing function.

56. The non-transitory computer-readable medium of claim 48, wherein the instructions are further executable by the processor to:

access a routing table associated with the plurality of node functions; and forward data between the plurality of node functions based at least in part on the routing table.

57. The non-transitory computer-readable medium of claim 48, wherein the instructions are further executable by the processor to:

operate according to a routing function associated with the plurality of node functions; and forward data between the plurality of node functions in accordance with the routing function.

\* \* \* \* \*